US009816899B2

(12) United States Patent
Braghiroli et al.

(10) Patent No.: US 9,816,899 B2
(45) Date of Patent: Nov. 14, 2017

(54) COMMUNICATION SYSTEM FOR A TYRE SERVICE MACHINE AND MEASURING UNIT FOR BEING USED WITH SUCH COMMUNICATION SYSTEM

(71) Applicant: Snap-on Equipment Srl a unico socio, Correggio (RE) (IT)

(72) Inventors: Francesco Braghiroli, Reggio Emilia (IT); Marco Tralli, Modena (IT); Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 0 days.

(21) Appl. No.: 14/809,160

(22) Filed: Jul. 24, 2015

(65) Prior Publication Data

US 2017/0023442 A1 Jan. 26, 2017

(51) Int. Cl.
*H04B 5/00* (2006.01)
*H04W 84/18* (2009.01)
(Continued)

(52) U.S. Cl.
CPC ......... *G01M 17/021* (2013.01); *H04W 4/005* (2013.01); *H04W 84/18* (2013.01)

(58) Field of Classification Search
CPC . G01M 15/106; G01M 17/021; H04W 4/005; H04W 84/18; H04B 5/0043; H04B 2203/5458
See application file for complete search history.

(56) References Cited

U.S. PATENT DOCUMENTS 6,085,428 A * 7/2000 Casby ........................ B60S 5/00 33/286
6,293,147 B1 * 9/2001 Parker ..................... G01M 1/16 340/870.16
(Continued)

FOREIGN PATENT DOCUMENTS

EP 0 735 356 A2 10/1996
EP 1 089 059 B1 9/2007
(Continued)

OTHER PUBLICATIONS

Extended European Search Report issued in corresponding European Patent Application No. 15178324.8, dated May 9, 2016.

*Primary Examiner* — Andrew Wendell
(74) *Attorney, Agent, or Firm* — McDermott Will & Emery LLP

(57) ABSTRACT

The present invention relates to communication system for tyre service machine being configured for receiving tyre and/or rim of vehicle wheel rotatably about rotation axis, the communication system comprising at least one processing unit and at least one measuring unit, at least one measuring unit comprising at least one sensor component for measuring at least one property of wheel, processing component for processing data acquired by at least one sensor component and/or for processing input data received from at least one of at least one processing unit, at least one processing unit and at least one measuring unit each comprising data communication component for receiving data from and/or transmitting data to another data communication component. The data communication component of processing unit and data communication components of at least one measuring unit are arranged for communicating wirelessly with each other in accordance with at least one sensor-independent protocol.

20 Claims, 11 Drawing Sheets

70 80 20 28 29 100 109 108 14 10 12 89 88 90 98 99 209 208 202 200

(51) Int. Cl.
*G01M 17/02* (2006.01)
*H04W 4/00* (2009.01)

(56) References Cited

U.S. PATENT DOCUMENTS

| | | | | |
|---|---|---|---|---|
| 6,779,400 | B1 | 8/2004 | Thelen et al. | |
| 2002/0018218 | A1 | 2/2002 | Conheady et al. | |
| 2005/0258384 | A1* | 11/2005 | Leutner | F16K 31/046 251/129.15 |
| 2006/0016309 | A1* | 1/2006 | Spaulding | G01M 1/326 83/567 |
| 2007/0174022 | A1 | 7/2007 | Wiles et al. | |
| 2009/0277265 | A1* | 11/2009 | Sotgiu | G01M 1/045 73/462 |
| 2012/0223595 | A1 | 9/2012 | Oodachi et al. | |
| 2012/0240677 | A1* | 9/2012 | Sotgiu | G01M 1/04 73/462 |
| 2013/0271574 | A1* | 10/2013 | Dorrance | H04N 7/18 348/46 |
| 2014/0250995 | A1* | 9/2014 | Vaeretti | B60T 17/223 73/132 |
| 2017/0023443 | A1* | 1/2017 | Cavalli | G01M 17/027 |

FOREIGN PATENT DOCUMENTS

| | | | |
|---|---|---|---|
| EP | 2141474 | A1 | 1/2010 |
| EP | 2360461 | A1 | 8/2011 |
| EP | 2503313 | A1 | 9/2012 |
| EP | 2775281 | A1 | 9/2014 |

* cited by examiner 1
100
108
109
90
98
99
80
88
89
20
28
29
200
208
209

10
12
14
20
28
29
70
80
88
89
90
98
99
100
108
109
200
202
208
209

70
74
22
X
72
26
20
76
100
24
28
Y
29
60
50
40
108
109
14
10
12
Z

X
Y
Z
20
22
24
26
27
30
40
50
60
74

30
36
34
35
33
32
31
42
50
60
X
Y

R
82
87
86
85
87
84
87
88
89
81
83
E
80

90
AE
93
92
91
94
98
99
97
AP
96a
96b
96
DP

96e
MP
96d
96a
96b
96c
96

AE
MP
FP
94
AP
DP

COMMUNICATION SYSTEM FOR A TYRE SERVICE MACHINE AND MEASURING UNIT FOR BEING USED WITH SUCH COMMUNICATION SYSTEM

The present invention relates to a communication system for a tyre service machine and a measuring unit for being used with such communication system.

More precisely, the present invention relates to a communication system for a tyre service machine, such as a wheel balancing machine, being configured for receiving a tyre and/or a rim of a vehicle wheel rotatably about a rotation axis, the communication system comprising at least one processing unit and at least one measuring unit, the at least one measuring unit comprising at least one sensor component for measuring at least one property of the wheel, a processing component for processing data acquired by the at least one sensor component and/or for processing input data received from at least one of the at least one processing unit, the at least one processing unit and the at least one measuring unit each comprising a data communication component for receiving data from and/or transmitting data to another data communication component.

In the art, communication systems for tyre service machines, in particular wheel balancing machines, comprising a variety of measuring sub-systems or units are known. However, these communication systems known in the art present certain inconveniences in terms of installation, maintenance and flexibility of expansion of the systems. Further, the known communication systems are not readily compatible with or adaptable to future legal protocolling or logging requirements.

In EP patent application 2 503 313 a measuring unit for a wheel balancing machine is disclosed, wherein the measuring unit comprises a stationary frame, a first bearing, a measuring shaft mounted rotatably about its shaft axis in the first bearing, a mounting means provided on the measuring shaft designed for attachment of the rotor, wherein the rotor is designed to be balanced in at least one compensating plane, a second bearing pivotally supporting the first bearing about a pivot axis which intersects the shaft axis and being supported on the stationary frame, a first force sensor for measuring forces generated by the unbalance of the rotating rotor and acting about the pivot axis, and a second force sensor for measuring forces generated by the unbalance of the rotating rotor and acting on the measuring shaft and on the second bearing in a direction intersecting the shaft axis.

The force sensors disclosed in EP patent application 2 503 313 A1 provide an analogue signal corresponding to a certain strain or force, to which the tyre service machine has to be gauged or calibrated. Upon replacement of the entire measuring unit, or at least of one of the force sensors, the entire machine has to be recalibrated, which can lead to undesirable additional work for the user or the technician. Further, the measurement signals of the first and the second sensor have to be transferred to a processing component of the wheel balancing machine by means of electrical cables, which can make it cumbersome to disconnect and remove the measuring unit in case of maintenance and the like.

From EP patent application 2 360 461 A1, an apparatus for determining geometrical dimensions of a wheel mounted for instance on a tyre service machine is known, which includes a measuring unit with a sensor component, like an ultrasonic sensing unit, including an emitter/receiver transmitter for scanning the wheel, and an angle measuring means including accelerometer means to measure a pivot angle of the measuring unit. The measuring unit is mounted to a hood of a wheel balancer, and is pivoted together with the hood for executing a measurement operation.

However, the components of the sensing unit have to be aligned to each other and calibrated with the rest of the tyre service machine after assembling, which is time consuming. Moreover, maintenance and replacement of such sensing unit becomes difficult.

Another example for measuring units used in practice is, for instance, a rotary or angular encoder for the rotary position of a vehicle wheel which is non-rotatably connectable to a measuring shaft of the wheel balancing machine. In particular, optical encoders for encoding the rotary position are known. Further, also measurement devices that are located outside the "measurement" core of the wheel service machine, such as sensors for obtaining tyre tread data, are contemplated. Yet, all these different measuring units present the difficulties for the measured data to be transferred to and understood by the wheel service machine, in order for the service operation to be performed in the desired manner. In particular, it can be difficult during maintenance or replacement operations, concerning a particular measuring unit, for the wheel service machine to function properly, for instance due to calibration and communication issues arising in combination with the raw data provided by the various sensors.

It has thus been an object of the present invention to provide an improved communication system for a tyre service machine, which allows for a more convenient exchange, expansion and maintenance of the tyre service machine or subunits thereof.

In one embodiment of the present invention, a communication system for a tyre service machine as mentioned above is provided, wherein the data communication components of the at least one processing unit and the data communication components of the at least one measuring unit are arranged for communicating wirelessly with each other in accordance with at least one sensor-independent protocol.

In the context of this application, a tyre service machine indifferently relates to a wheel balancer, a tyre changer, a brake or suspension testing equipment, or a vehicle lift.

Since the data communication component is configured for transmitting the data wirelessly, it is not necessary for communication cables to be connected between the measuring unit and the tyre service machine. This facilitates substantially installation, replacement and maintenance of each measuring unit used in connection with a tyre service machine. Further, by omitting physical cables between measuring unit and tyre service machine, space occupied by cables is not necessary anymore, such that the overall dimensions of the tyre service machine can be reduced. Thereby, additionally a higher degree of accuracy can be achieved, since a thereby achievable smaller distance between the measuring unit and the vehicle wheel mounted on the tyre service machine can account for a higher accuracy of the measurements carried on by the measuring unit.

Thereby, the communication system allows that different measuring units are used with the same tyre service machine. Generally, sensors of the measuring unit provide raw data, which has to be understood by processing means. If these raw data are to be transferred to a processing unit, the receiver, for instance the tyre service machine, has to know exactly which raw data it is supplied with by the measuring unit. In case a sensor or the like of the measuring unit gets replaced or changed, there exists the possibility that the raw data sent to the processing unit differ from the raw data the processing unit is aligned to. By providing a processing component integrally with the measuring unit, the measuring unit can provide processed data of always the same data format to the processing unit. More particularly, the measuring unit itself can be calibrated, such that the sensors of the measuring unit are calibrated with respect to the processing component formed in the measuring unit. In this case, it must not be necessary for the measuring unit to be calibrated with respect to the processing unit or the tyre service machine.

In one development, at least one processing unit is a processing unit of the tyre service machine. For example, the central processing unit is a central processing unit for performing calculations necessary for the servicing operation to be carried out by the tyre service machine. However, this processing unit can also be a display unit, an input/output unit, an electromagnetic brake, a pedal or other processing unit known in the art.

In a further development of the communication system according to the present invention, at least one processing unit is located remote from the tyre service machine. In this development, the processing unit is preferably a remote display and/or control unit, such as a tablet computer, a desktop computer, a smartphone, a network or Internet server, or a cloud computer service. Thereby, the operation area for the performance of a servicing operation is not restricted by the physical dimension of the tyre service machine and therefore the operator can gain flexibility and efficiency in carrying out and analysing the servicing operation. In other words, in this development it is possible to perform wireless data communication according to sensor-independent protocols between measuring units associated with the tyre service machine and processing units outside or remote from the tyre service machine.

In another development, at least one processing unit can also be provided with a sensor component and thus substantially correspond to one of the at least one measuring units. In this development, at least two measuring units can perform data communication among each other in accordance with the sensor-independent protocol, without relying on a distinct processing unit which is not associated with sensor capabilities. The overall system can thus be designed more efficiently by allowing a decentralised data communication. In other words, since each measuring unit comprises a processing component, it can at the same time be considered a processing unit with the additional sensing or measuring capability.

In a further development of the communication system according to the present invention, at least one processing unit comprises a data recording component for recording data received by the data communication component of the processing unit from the data communication component of the measuring unit.

For reasons of security and liability, tyre service machines will be required to protocol or record all service operations, such as balancing operations or time mounting operations, which are performed by the respective tyre service machine in the future. Since in this development the processing unit comprises a data recording component, data received by the data communication component of the processing unit is already in a known format due to the sensor independent protocol used for transmitting data, this data can easily be recorded and protocolled for future use. In a different development, the data recording component can also be located remote from the processing unit and the tyre service machine, such as in a server connected via a network, such as the Internet.

In a further development of the communication system according to the present invention, at least one of the at least one measuring unit and/or at least one of the at least one processing unit is provided within a casing. Such casing can advantageously protect the units and/or components of the communication system within the casing from damage and breaking-down.

The casing is in a further development a metallic casing, such as a machine frame of the tyre service machine.

In this development, the metallic casing can be a machine frame of the tyre service machine. However, the metallic casing can also be a different casing. Moreover, a metallic casing of at least one of the at least one measuring unit can be a different casing which is different from the metallic casing of the processing unit.

A surrounding metallic casing can serve as a filter means for attenuating unwanted wireless data communication from the outside and can impede wireless data communication from the inside from being intercepted outside the metallic casing.

In case at least two of the at least one measuring unit and the processing unit are provided within the same metallic casing, wireless data transmission is effortlessly possible despite the provision of a metallic casing surrounding the respective data communication components. Thereby, although metallic casings can impede or attenuate wireless data transmission, data communication in the communication system according to the present invention is advantageously applicable in the well-established environment of tyre service machines comprising metallic machine frames.

In an even further development of the communication system according to the present invention, the metallic casing comprises at least one transmitting window.

The at least one transmitting window can, for instance, comprise a non-metallic material, such as of a plastic material. By providing at least one transmitting window, the inventive communication system can also wirelessly communicate from the inside to the outside of the metallic casing. The at least one transmitting window is preferably aligned with the data communication component of the measuring unit or the processing unit such that the data communication efficiency improves.

In a further development of the communication system according to the present invention, the communication system comprises at least two measuring units, wherein the data communication component of at least one processing unit is arranged to communicate with the at least two measuring units using the same sensor-independent protocol.

In other words, the sensor-independent protocol is arranged for supporting more than one measuring units at the same time. Thereby, no individual protocol has to be defined between processing unit and the respective measuring units, but the same sensor-independent protocol can be employed for the data communication among all units. Nevertheless, it is also contemplated in different developments that the respective measuring units communicate in accordance with distinct sensor-independent protocols and that measuring units are configured for communicating with multiple sensor-independent protocols at the same time.

In one development, the communication system according to the present invention comprises at least two processing units, wherein the data communication components of the at least two processing units are arranged for communicating wirelessly with each other in accordance with at least one sensor-independent protocol. In this development, two processing units can communicate with each other without relying on sensor capabilities of a measuring unit.

For instance, the processing units are selected from an operation pedal, a display screen, an electromagnetic brake, a remote server, a tablet computer or the like. Nevertheless, in other developments, the processing units can also include other processing units known in the art.

In a further development, the data communication components of the at least one processing unit and the at least one measuring unit are arranged for communicating according to at least two sensor-independent protocols, wherein at least one sensor-independent protocol is a local sensor-independent protocol for communication local to the tyre service machine, and wherein at least another sensor-independent protocol is a remote sensor-independent protocol for communication with remote data communication components. In this development, the local sensor-independent protocol can preferably be optimised for increased data transmission rate or low power usage, wherein the remote sensor-independent protocol can preferably be optimised for data transmission integrity and/or secured against interception. Thereby, the benefits of each of a respective local and remote protocol can be maintained, without the need for dealing with the complexities of the respective other.

In one embodiment of the present invention, a measuring unit for a communication system for a tyre service machine according to the present invention is disclosed, comprising at least one sensor component for measuring at least one property of the wheel, a processing component for processing data acquired by the at least one sensor component and/or for processing input data received from a processing unit, and a data communication component for transmitting data to and receiving data from at least the processing unit, wherein the data communication component is configured for communicating wirelessly in accordance with a sensor-independent protocol.

In this context it should be noted that the processing unit can also be, as described above, another measuring unit, which corresponds to a processing unit provided with sensing or measuring capabilities.

In one development of the measuring unit according to the present invention, the processing component is formed integrally with the measuring unit.

In this context, the term integrally is to be understood that the processing component uniquely belongs to the measuring unit and is comprised in the measuring unit in case the measuring unit is provided, installed or removed. In other words, the processing component is installed at or removed from the tyre service machine only together with the measuring unit and does not form part of the tyre service machine.

By providing the processing component integrally with the measuring unit, the measuring unit becomes autonomous and can be employed independently with respect to the tyre service machine.

Since the measuring unit is autonomous and communicates wirelessly with the processing unit, it must not be provided directly at the tyre service machine, but can however be positioned at an arbitrary position. This increases the flexibility of measuring units to be used with the present communication system.

In a further development of the measuring unit according to present invention, the tyre service machine is a wheel balancing machine and the wheel balancing machine comprises a measuring shaft configured for receiving the vehicle wheel thereon and being displaceable by unbalanced rotation of the vehicle wheel about the measuring shaft, wherein the sensor component is arranged for measuring a displacement of the measuring shaft upon unbalanced rotation of the vehicle view. Thereby, it is possible to employ the measuring unit according to the invention for the process of balancing an unbalanced vehicle wheel.

In a further development of the measuring unit according to present invention, the measuring shaft comprises mounting means designed for an attachment of the vehicle wheel being designed to be balanced in at least one compensating plane. By providing the measuring shaft with mounting means for attaching the vehicle wheel, it is preferably possible to mount the vehicle wheel onto the wheel balancing machine in order for it to be balanced. Preferably, the mounting means allow together with a measuring unit that a virtual-plane-style measuring and balancing be performed.

In one development, the measuring unit comprises a stationary frame, a first bearing for receiving the measuring shaft rotatably about its shaft axis, and a second bearing pivotally supporting the first bearing about a pivot axis which intersects the shaft axis, and being supported on the stationary frame.

With this configuration, the measuring shaft can rotate about its shaft axis in the first bearing, wherein unbalances of the vehicle wheel mounted on the measuring shaft result in a pivot movement of the first bearing in the second bearing.

In a further development of the measuring unit according to present invention, the at least one sensor component comprises a first force sensor for measuring forces generated by the unbalance of the rotating vehicle wheel and acts on the measuring shaft about the pivot axis, and a second force sensor for measuring forces generated by the unbalance of the rotating vehicle wheel and acting on the measuring shaft and on the second bearing in a direction intersecting the shaft axis.

By providing two force sensors for measuring forces in different directions, two substantially independent measurements can be obtained. In other words, it is possible by thus providing two independent measurements to separate two measurement planes of the rotating vehicle wheel.

In one development, of the measuring unit according to the present invention, the first force sensor is positioned and tensioned between the first bearing and the second bearing.

Preferably, the first force sensors measure a force between the first bearing and the second bearing and the second force sensors measure a force between the second bearing and the stationary frame.

The measuring directions of the first force sensor and the second force sensor extend preferably in one common plane which passes through the shaft axis.

In one development of the measuring unit, the second bearing and the stationary frame are integrally formed of a single element as a support plate.

By providing a support plate formed of a single element comprising the second bearing and the stationary frame, the overall axial extension of the second bearing can be reduced to the axial extension of the support plate only. Particularly, the support plate allows a compact, single piece arrangement. The need for providing a complex frame structure including attachment means for attaching the second bearing to the stationary frame is avoided. Further, as the number of parts assembled together to form the measuring unit is reduced compared to the prior art, the manufacturing costs and effort are reduced. Further, also more free space is left for additional entities of the tyre service machine, such as the wheel balancing machine. Finally, also the overall axial extension of the measuring unit and measuring shaft assembly, such as the wheel balancing machine, can be reduced. Thereby, measuring accuracy can be increased.

In one development of the measuring unit, the second force sensor is arranged substantially perpendicular to both the pivot axis and the shaft axis.

By this arrangement, the forces measured by the second force sensor are not overlaid with forces resulting from movements along the shaft axis or rotations about the pivot axis. Since the axes are substantially perpendicular to each other, force and movement components in each of the respective other axes are zero.

In this context, substantially perpendicular means an angle of between 80° and 100°, more preferably between 85° and 95° and most preferably between 89° and 91°.

In a further development, the detection axis of the second force sensor is arranged substantially perpendicular to both the pivot axis and the shaft axis in a resting position of the measuring shaft. With a resting position, it is referred to the position in which no force is applied to the pivot axis by the first spring. In this position, a transverse axis is perpendicular to both the pivot axis and the shaft axis. Since the second force sensor is preferably aligned with the transverse axis, also the second force sensor is arranged perpendicular to both of the pivot axis and the shaft axis.

In one development of the measuring unit, the first force sensor is arranged substantially parallel to the shaft axis.

In this context, substantially parallel means an angle between two axes of between 0° and 10°, more preferably between 0° and 5° and most preferably between 0° and 1°.

For measuring a rotation about the pivot axis, the first force sensor has to be inclined with respect to the pivot axis. In order to obtain the most accurate pivot force measurement, it is preferred for the first force sensor to be arranged perpendicular to the pivot axis. In this development, the first force sensor is arranged substantially parallel to the shaft axis in order for the mounting arrangement to be more compact. However, in other developments, also different arrangements of the first force sensor, such as perpendicular to the shaft axis or the like, are contemplated, as long as the first force sensor is not arranged along the pivot axis.

In a further development of the measuring unit according to present invention, the measuring unit further comprises at least one first spring for pivotally supporting the first bearing within the second bearing about the pivot axis. Providing springs allows for the system to return to the undisturbed situation, wherein an increased disturbance from the resting position creates a larger force for the system to return to the resting position due to the springs.

In one development, the at least one first spring is formed by at least one torsion spring. Since the first spring is formed by at least one torsion spring, rotational disturbance of the system, namely the first bearing being rotated with respect to the second bearing about the pivot axis, is forced so as to return to the resting position. And additionally, since rotational displacement creates counter forces in the torsion springs, the displacement can be used to be translated into an unbalance force. Thus, it can in one development not be necessary to directly measure the forces, but to measure the rotational displacement instead. In other words, instead of measuring unbalance forces, also the measurement of rotational displacements, velocities (variation in displacements) and accelerations (variations in velocities) can be considered.

By providing one or more torsion springs between the first bearing and the second bearing, an axis about which the first bearing is pivotable can be defined by means of the torsion springs. Thus, a retaining force retuning the first bearing to the original position thereof is obtained by a pivot rotation about the torsion springs between the first bearing and the second bearing.

In one development, the measuring unit comprises at least one second spring for supporting the second bearing within the stationary frame. Preferably, the at least one second spring includes one or more plate springs.

By providing a second spring, substantially the same advantages as by providing the first spring can be achieved, namely to return the position of the second bearing within the stationary frame to a resting position. The force with which the second spring forces the system consisting of the second bearing and the stationary frame towards the resting position increases with the deviation of the second bearing or the stationary frame, respectively, from the resting position. In one development, the at least one second spring is formed by at least one plate spring.

Thereby, linear movement along the plate spring axis is possible, whereas movement perpendicular thereto is inhibited by the plate spring. Thus, in case the plate spring is arranged such that the movement along a transverse axis is possible, a movement of the second bearing relative to the stationary frame along a pivot axis and/or the shaft axis is not possible.

In one development of the measuring unit, the support plate comprises at least one of the at least one first spring and the at least one second spring as an integral part thereof.

Since the support plate comprises the at least one second spring as an integral part thereof, the number of parts can further be reduced. Moreover, no axial extension of the support plate is needed in order for the second spring to be attached between the second bearing and the stationary frame, wherein the second spring allows a linear movement between the second bearing and the support plate in the transverse direction. In addition to the size saving advantage, since the number of components gets reduced, manufacturing becomes easier and more cost-efficient.

In a further development of the measuring unit according to present invention, the second bearing is formed of a plate, preferably a flat plate, in a plane substantially perpendicular to the shaft axis of the measuring shaft. Thereby, the measuring group can be designed more compact and the overall size of the tyre service machine thus can be reduced. At the same time, the accuracy of the unbalance measurements can be improved.

In a further development of the measuring unit according to present invention, the one or more torsion springs are integrally formed of a single element with the second bearing. By providing the one or more torsion springs integrally as a single element with the second bearing, the number of parts can be reduced, which leads to a reduction of the effort for assembly and maintenance.

In one development of the measuring unit according to the present invention the at least one second spring is configured such that the second bearing is translational moveable with respect to the stationary frame in a transverse axis perpendicular to the shaft axis and/or the pivot axis.

For instance, the translation may be possible in the transverse axis in this development. However, the definition of transverse, pivot and shaft axis is arbitrary and also a different selection of axes is possible.

In a further development of the measuring unit according to present invention, the stationary frame, the second bearing and the first bearing are integrally formed of a single element. Thereby, vibration measurements can be self-contained within the group itself, such that measurements can be independent from the surrounding cabinet structure. Moreover, as the number of parts is further reduced, also assembly and maintenance effort can be reduced.

In one embodiment, the measuring unit according to the present invention comprises a drive support member in rigid connection with the first bearing for supporting a drive means for rotating the vehicle wheel about the shaft axis, wherein the first sensor is with one end thereof mounted to the drive support member.

Since the first sensor is on one end thereof mounted to the drive support member, it is not necessary to provide a distinct mounting means for one side of the first sensor, as the drive support member is in any case necessary in order to support a drive means for rotating the rotor about the shaft axis. In other words, a component already provided with the measuring assembly is reused and functions at the same time as a support for the first force sensor.

In a further development, the mounting assembly according to the present invention comprises a lever extending from the second bearing substantially parallel to the drive support member, wherein the second end of the first force sensor is mounted to the lever.

By mounting the first force sensor between the drive support member and the lever extending from the second bearing, the first force sensor gets fixed between the first bearing, which is rigidly connected to the drive support member, and the second bearing, to which the lever is rigidly connected. Accordingly, such mounted first force sensor can measure the pivot force between first bearing and second bearing about the pivot axis. More precisely, any displacement between lever and drive support member is proportional to the torsion angle between them about the pivot axis.

In this development, the first force sensor is mounted between the first bearing and the second bearing. However, in a different development, the first force sensor can also be mounted between the first bearing and the stationary frame. In this case, the first force sensor will measure a force of the pivot force overlaid with the transverse force acting between second bearing and stationary frame. However, since the pivot axis and thus the pivot movement is perpendicular to the transverse movement, a separation between both movements is easily possible. Further in this example, a lever is not necessarily needed, since the first force sensor can directly be mounted between the drive support member and the stationary frame.

In a further embodiment of the measuring unit according to present invention, the measuring unit comprises a drive means for enabling a pivotal movement of the at least one sensor component, wherein the at least one sensor component comprises a first sensor for sensing the vehicle wheel, and a second sensor for sensing the angular position of the sensor component; wherein the processing component is configured for determining the geometrical dimensions of the vehicle wheel based on the data received from the first sensing unit and the second sensing unit.

In this embodiment, the measuring unit is not arranged for determining an unbalance of the vehicle wheel, but for determining the geometrical dimensions of the vehicle wheel instead. A tyre service machine can be provided with such measuring unit in addition or instead of a measuring unit for determining an unbalance of the vehicle wheel.

Also concerning the measuring unit of this embodiment, the provision of data processing component and data communication component allows for all measuring units to communicate either among each other or with the processing unit. Since the same sensor-independent protocol is applied, also a change or replacement of any of the measuring units is easily possible.

In a further development of the measuring unit according to present invention, the first sensor is an optical sensor including an emitter, preferably a laser emitter, and a receiver, preferably a CCD or CMOS component.

In the context of this application, the terms measure or measuring are not to be understood in a limiting way and shall include all forms of sensing and acquiring properties and information.

By providing an optical sensor as the first sensor, the measuring unit can, for instance, determine the geometrical information, such as the geometrical dimensions, of the vehicle wheel, by optically sensing the vehicle wheel. Although a laser emitter and a CCD or CMOS component are disclosed as examples for the optical emitter and the optical receiver, other optical emitters and receivers as known in the art are contemplated.

In a further development of the measuring unit according to present invention, the measuring unit comprises a carrier element providing an assembling aid structure for having a defined positional relationship of the components of the measuring unit to each other, wherein at least the first sensor, the second sensor and the drive means are commonly mounted on the carrier element.

The arrangement of the first sensor, the second sensor and the drive means common together on the carrier element allows a compact design of the measuring unit, which may be configured as a separate device being independent from the construction of the tyre service machine in which it is used. Moreover, due to the fixed and known positional relationship more accurate measurement results can be achieved. Even further, as the alignment of the components of the measuring unit can be carried out during assembly, replacement and maintenance of such measuring unit can be facilitated.

In a further development of the measuring unit according to present invention, the drive means is a micro-stepper motor, thereby disposing of any mechanical reduction gear.

A micro-stepper motor, in contrast to a conventional stepper motor, can be controlled such that the measuring unit may be positioned at any desired position. The resolution and accuracy of the measurement results can thus be increased. By providing a drive means for the measuring unit, which is realized by a micro stepper motor, a high resolution of a scan may be reached without the need of a reduction gear. This enables an increase in the accuracy of the scan, due to the fact that no additional mechanical transmission elements are arranged between the motor and the measuring unit, whereby additional vibrations are omitted.

In an even further development of the measuring unit according to the present invention, in order to determine the angular position of the measuring unit, the second sensor is provided with at least one position sensitive element. Preferably, the second sensor comprises at least one accelerometer sensor. Such a sensor may provide very accurate results regarding the pivot angle of the measuring unit. Accelerometer sensors, additionally, may sense pivot angles not only in one plane, but also in more than one plane, like in two planes arranged at a defined angle between each other, for determining the exact position of the measuring unit. However, even though an accelerometer sensor is described as an example for the position sensitive element, also different position sensors are contemplated by a person skilled in the art.

In a further development of the measuring unit according to the present invention, the tyre service machine is a wheel balancing machine and comprises a measuring shaft to which the vehicle wheel to be balanced is non-rotatably connectable, the measuring unit comprises a drive means for rotating the measuring shaft about an axis of rotation, and the sensor component is associated with an electronic component for controlling the drive means. In this development, the sensor component can, for instance, be a sensor for measuring current absorption by the operation of the drive means in order to determine a property of the vehicle wheel, such as inertia of the vehicle wheel. However, also other types of sensor components for measuring different properties of the vehicle wheel are contemplated in this development.

In a further embodiment of the measuring unit according to present invention, the tyre service machine is a wheel balancing machine and comprises a measuring shaft to which the vehicle wheel to be balanced is non-rotatably connectable and which is rotatable about an axis of rotation, wherein the at least one sensor component comprises a rotary angle sensor being connected to the measuring shaft and having a light-emitting emitter, rotary angle increments in the form of reflectors arranged at equal angular spacings from each other on a circle rotatable about the axis of rotation, and a detector to which the light emitted by the emitter is passed by way of the rotary angle increments, the processing component being arranged for evaluating signals from the detector for rotary angle detection.

Such measuring unit allows the encoding of the rotary information of the measuring shaft of the wheel balancing machine. Although in this embodiment the sensor component comprises optical sensor means such as a light emitting emitter, other sensor means, such as magnetic sensor means and the like, are contemplated by a person skilled in the art.

Also with respect to this measuring unit, the advantages as mentioned above concerning the other measuring units in terms of the data communication component and the use of a sensor-independent protocol apply likewise.

In a further embodiment of the measuring unit according to present invention, the measuring unit is formed as a feeler unit for contacting the vehicle wheel at a defined position and comprising an axial extension section for translating the feeler unit along an axis substantially parallel to a main axis of the tyre service machine, and a radial rotation section for rotating the feeler unit about the axis defined by the axial extension section, wherein the radial rotation section extends from the axial extension section at the end on the vehicle wheel side thereof in a direction substantially perpendicular to the axial extension section, and the at least one sensor component comprising a first sensor, such as a first potentiometer, for measuring a rotation of the radial rotation section, and a second sensor, such as a second potentiometer, for measuring an extension of the axial extension section.

The feeler unit of this development is preferably arranged in the form of a feeler arm which corresponds to a structure for contacting the inner circumference of the rim of the vehicle wheel at a precise position. More particularly, an end of the rotation section is arranged for contacting the inner circumferential surface of the rim of the vehicle wheel at a precise position. A measuring unit of this development further allows, for instance, determining geometrical information of the vehicle wheel mounted on the wheel balancing machine, or a different tyre service machine respectively, by translating and rotating the extension section and the radial rotation section until at least an end of the radial rotation section contacts the vehicle wheel from the inside thereof.

The sensor-independent protocol is also particularly useful for the feeler unit of this development. More precisely, since data is transmitted wirelessly and sensor-independently, no connection by means of cable or the like is necessary between the feeler unit and the tyre service machine. Thus, the feeler unit has no limitation as to its position, but can be positioned freely. In another development, the file unit can also be provided independently from the tyre service machine, for instance as a portable unit for sensing the rotating vehicle wheel manually, such as held in a hand of a technician.

In this development, potentiometers are employed as means for the first sensor and the second sensor. However, in other developments, also different sensors such as magnetic sensors and the like as known in the art are contemplated.

Further, in this development, the feeler unit provides two degrees of freedom, namely the extension along the extension section and the rotation of the rotation section about an axis defined by the extension section. However, in different developments, the number of degrees of freedom can also be different from two, such as more than two, for instance three or four. In other words, a feeler unit comprising additional degrees of freedom is also contemplated by the person skilled in the art.

In a further development of the measuring unit according to present invention, the feeler unit further comprises extension drive means for translating the axial extension section, and rotation drive means for rotating the radial rotation section, wherein the processing component is arranged for actuating the extension drive means and/or the rotation drive means in response to data received by the data communication component, such that the feeler unit is positioned at a particular position.

By further providing extension drive means and rotation drive means, the feeler unit can be driven to contact an arbitrary position on the inner circumferential surface of the vehicle wheel, provided the vehicle wheel is in the correct rotational position. Preferably, the processing component controls the respective drive means such that the feeler unit gets positioned at a particular position for, for instance, depositing balancing weight at a predetermined position.

The processing component can preferably further be arranged for controlling a motor for rotating the vehicle wheel to position the vehicle wheel at a desired rotational position. Preferably, this controlling is also enabled by the sensor-independent protocol.

In a further development of the measuring unit according to present invention, the sensor component comprises an ultrasonic and/or a laser sensor. The sensor component is preferably arranged for being mounted on a wheel cover.

By mounting such sensor component on the wheel cover, additional properties of the vehicle wheel mounted on the tyre servicing machine can be determined by means of the measuring unit. Particularly, optical properties can be obtained by ultrasonic and/or the laser sensor comprised in the sensor component. Additionally, an ultrasonic sensor can measure properties such as damages of the wheel hidden below the surface of the rim and/or the tyre. In this case, since the wheel cover can be far away from the processing unit of the tyre service machine, it is of particular advantage that the measuring unit can perform wireless data communication and no cable is needed for a data connection to the data communication component.

In a further development of the measuring unit according to present invention, the sensor component comprises an optical camera. Preferably, the sensor component is mounted on a surface, such as the rear surface, of the tyre service machine such that the optical camera is able to measure tyre tread data of the tyre of the vehicle wheel.

Determining the tyre tread data by means of a measuring unit provides additional information that can be useful for the service operation to be performed by the tyre service machine, such as wheel balancing.

Also in this development, the sensor-independent protocol used for wireless transmission is particularly beneficial, since the tyre tread data can be useful for multiple other entities of the tyre service machine, wherein the measuring unit does not have to know exactly which entity will use its data and also the other entities do not necessarily have to know by which means the received data has been acquired since all this communication is managed by the sensor-independent protocol. Accordingly, communication among different measuring units and the processing unit is easily possible.

However, also sensor components comprising sensors different from optical sensors or cameras are contemplated for determining additional information of the mounted we could be in. For instance, the sensor component can comprise a digital chip reader, such as an RFC reader or the like, for reading electronic chips integrated within the vehicle wheel.

In a further development of the measuring unit according to the present invention, the processing component is configured for controlling at least one electronic component of the tyre service machine, wherein the electric component is preferably a driving component such as an electric motor or a clamping or braking system.

In this development, a potential malfunctioning of the entire tyre service machine can be prevented by the processing component being configured for controlling at least part of the tyre service machine, for instance a braking system. Preferably, in case a value sensed by the sensor component of the measuring unit exceeds a specific threshold value, such as a critical condition of unbalance or the like, an electric component of the tyre service machine can be operated, for instance the braking system activated, such that the tyre service machine stops operation before causing harm or damage to the tyre service machine. This communication of critical situations among all sensor units and the tyre service machine is preferably implemented into the sensor-independent protocol.

In summary, the communication system and the measuring units for this communication system provide for a communication which allows easier maintenance, facilitated expansion and also less complicated procedures for increasing safety and reducing errors. The sensor-independent protocol allows for different measuring units and the tyre service machine to communicate with each other, although one or more of the measuring units gets replaced, added and so on. Accordingly, various units can easily and without difficulties be combined and used together with the tyre service machine.

In an advantageous manner, multiple of the various developments of the measuring units according to the present invention can be combined simultaneously with a single tyre service machine. Moreover, due to the features of these measuring units, replacing of such measuring unit is facilitated.

Further, also different embodiments and developments of the measuring units described herein can be advantageously used in combination in a communication system according to the invention. Additionally, also multiple aspects of different measuring units can be combined in a single measuring unit.

Further advantages and embodiments of the present invention will be described in the following together with the drawings listed below.

Figure 1:
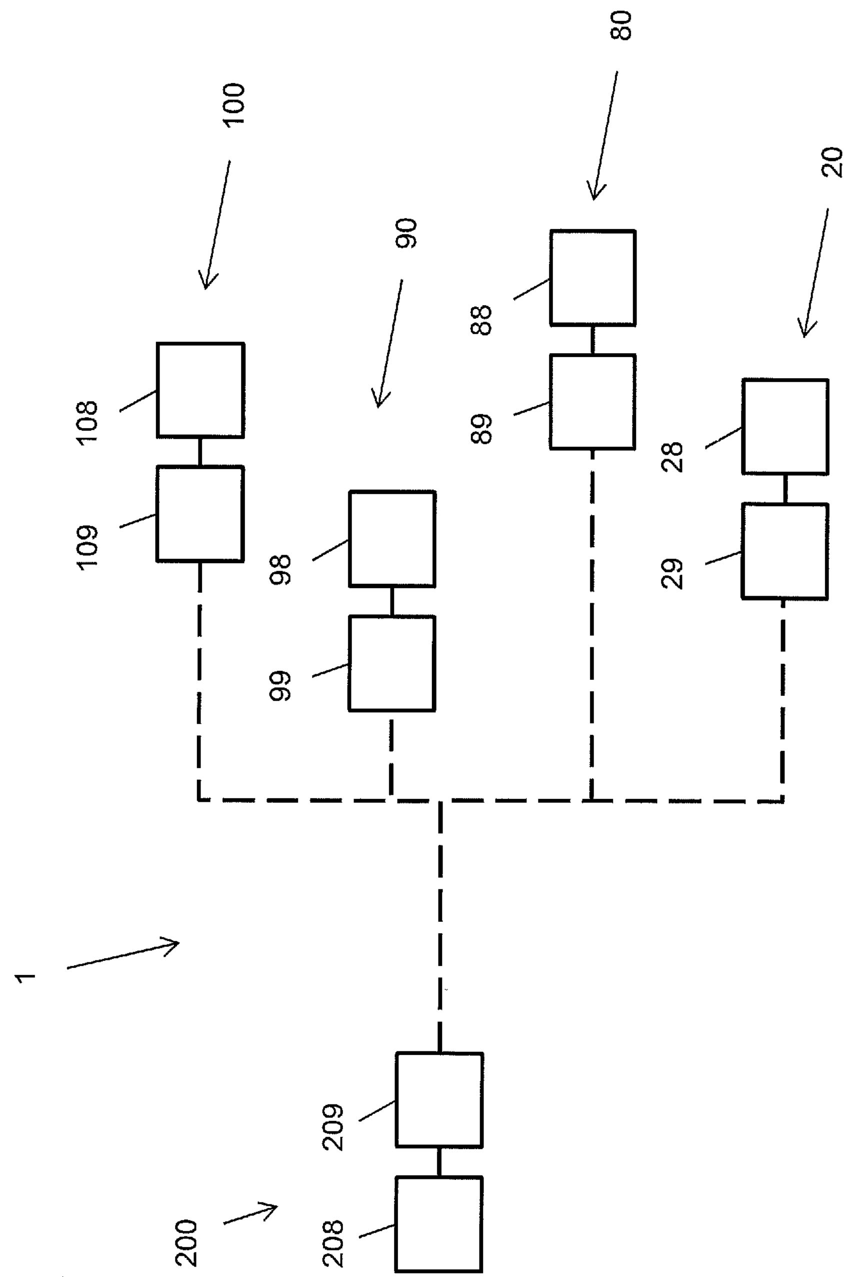
FIG. 1 is a schematic view of a communication system for a tyre service machine according to the present invention.

FIG. 1 shows schematically and exemplarily communication system 1 for the communication between a tyre service machine, such as wheel balancing machine 200, with at least one measuring unit, such as at least one of measuring units 20, 80, 90 and 100. In this example, wheel balancing machine 200 communicates with each of the respective measuring units 20, 80, 90 and 100. However, each of the measuring units 20, 80, 90 and 100 can also communicate with any other of the measuring units 20, 80, 90 and 100 and also all of the measuring units 20, 80, 90 and 100 as well as wheel balancing machine 200 can communicate with different communication units (not shown), such as a network resource or a server.

Wheel balancing machine 200 comprises a processing unit 208 which receives input from the respective measuring units and is arranged to perform the wheel balancing operation to be described later in detail. Processing unit 208 is connected to or comprises data communication component 209. Data communication component 209 is in this example a wireless data communication component for wirelessly transmitting and receiving data useful for the execution of the balancing operation. Processing unit 208 can be attached to or embedded within wheel balancing machine 200, for instance comprising an integrated display (not shown), can be detachable or detached, such as a handheld tablet device, or can be located at an arbitrary remote site, such as an internet server.

Further, also each measuring unit 20, 80, 90 and 100 comprises a respective processing component 28, 88, 98 and 108, which is arranged for receiving and processing measurement data received by at least one sensor contained in at least one sensor component of the respective measuring unit 20, 80, 90 and 100. Preferably, the respective processing component 28, 88, 98 and 108 receives raw data and processes the raw data, such that wheel balancing machine 200 can become independent from the particular choice of sensors or measuring units, as the processed data is commonly understandable, for instance, in a common data format. Thereby, it is also possible for each of the respective measuring units 20, 80, 90 and 100 to be installed readily calibrated, such that installation and maintenance effort for the respective measuring units is minimized. In addition, each of the measuring units 20, 80, 90 and 100 can be replaced by different or alternative measuring unit without changes or recalibration becoming necessary to the remaining wheel balancing machine 200.

Additionally, each of the processing components 28, 88, 98 and 108 is connected to or comprises a data communication component 29, 89, 99 and 109, respectively. In this example, each data communication component 29, 89, 99 and 109 is provided as a wireless data communication component. By means of the respective data communication component 29, 89, 99 and 109, data processed by the respective processing component can be transferred among the various measuring units 20, 80, 90 and 100 and also between the respective measuring unit and a processing unit of wheel balancing machine 200.

By providing the data communication components 29, 89, 99 and 109 as wireless data communication components, installation and connection effort and work in connection with cables can be omitted, such resulting in an easier and less error-prone assembly and maintenance, such as for instance by mal-connection of cables, of the respective measuring units 20, 80, 90 and 100 can be achieved. Moreover, by disposing of any physical cables, space occupied by cables is not needed anymore and wheel balancing machine 200 can be reduced in overall size, thereby possibly improving the balancing results as understood in the art.

Further, by employing a predefined protocol, the data communication becomes independent from the particular measuring sensor used. More specifically, the addressee of the data communication component 28, 88, 98, and 108 can recognize the processed data without an analysis of the data in view of sensor particularities becoming necessary. Thus, it is possible to alter, replace and/or add a measuring sensor to the measuring unit 20, 80, 90, 100 without difficulties for the other data processing component, such as processing unit 208 and corresponding data communication component 209 of the exemplary wheel balancing machine 200, to understand the altered and/or additional data.

In case communication system 1 communicates with a processing unit located remote from wheel balancing machine 200, such as an external server, a cloud service or the like, data transferred to the remote communication unit can be gathered and stored, such as in the form of one or more databases, with the remote communication unit. For instance, the remote communication unit can comprise a data recording component for this purpose. The stored or recorded data can later be used for technical and/or commercial services, such as for advertisement or for upcoming legal documentation purposes.

In a different example, a data recording component can also be provided with a local processing unit 208 and/or any of measuring units 20, 80, 90, 100. In this case, recorded data can be exploited in the same way as data recorded on a remote processing unit.

Figure 2:
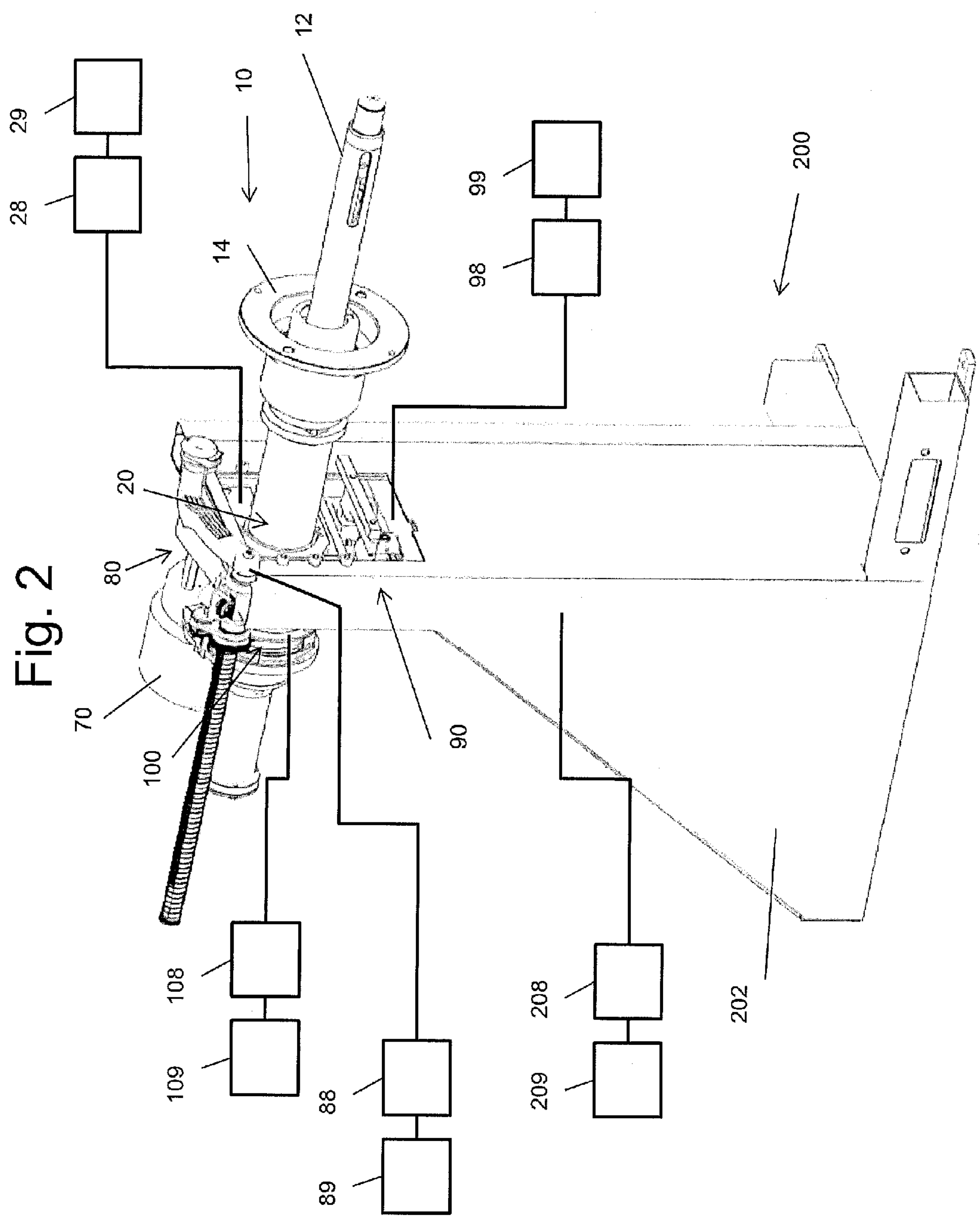
FIG. 2 is a schematic and perspective view of a wheel balancing machine as an example of a tyre service machine implementing the communication system of FIG. 1, comprising a processing unit and multiple measuring units.

FIG. 2 show a schematic perspective view of a wheel balancing machine 200 as an example for a tyre service machine employing communication system 1 according to the invention. FIG. 2 shows wheel balancing machine 200 from a front side thereof, wherein the wheel to be balanced is mounted to wheel balancing machine 200 from the front side thereof. Wheel balancing machine 200 comprises machine frame 202 which supports measuring assembly 10 including measuring shaft 12 on the upper end thereof by means of a bearing system, which will be described below with reference to FIGS. 3 to 5.

Measuring shaft 12 corresponds to a main shaft and is configured for receiving the vehicle wheel thereon and is displaceable by unbalanced rotation of the vehicle wheel about measuring shaft 12.

At the front end thereof, measuring shaft 12 comprises clamping means 14 designed for attachment of the vehicle wheel. In this example, the vehicle wheel is to be attached to wheel balancing machine 200 by means of clamping means 14 concentrically with measuring shaft 12 and rotated by a drive means 70, such as an electric motor, which transmits a rotational movement to measuring shaft 12.

Wheel balancing machine 200 operates by rotating an unbalanced vehicle wheel about measuring shaft 12 and measuring the effect caused by any unbalances in order to attach counterweights at suitable positions on the inner circumferential surface of the vehicle wheel rim.

Next, each of the respective exemplary measuring units 20, 80, 90 and 100 will be described with reference to FIGS. 3 to 11 in further detail. All measuring units 20, 80, 90 and 100 can be realized as replaceable, self-contained units which can sense and carry out measurements on their own, without relying on information from remaining parts, particularly electronics, of the wheel balancing machine 200.

Figure 3:
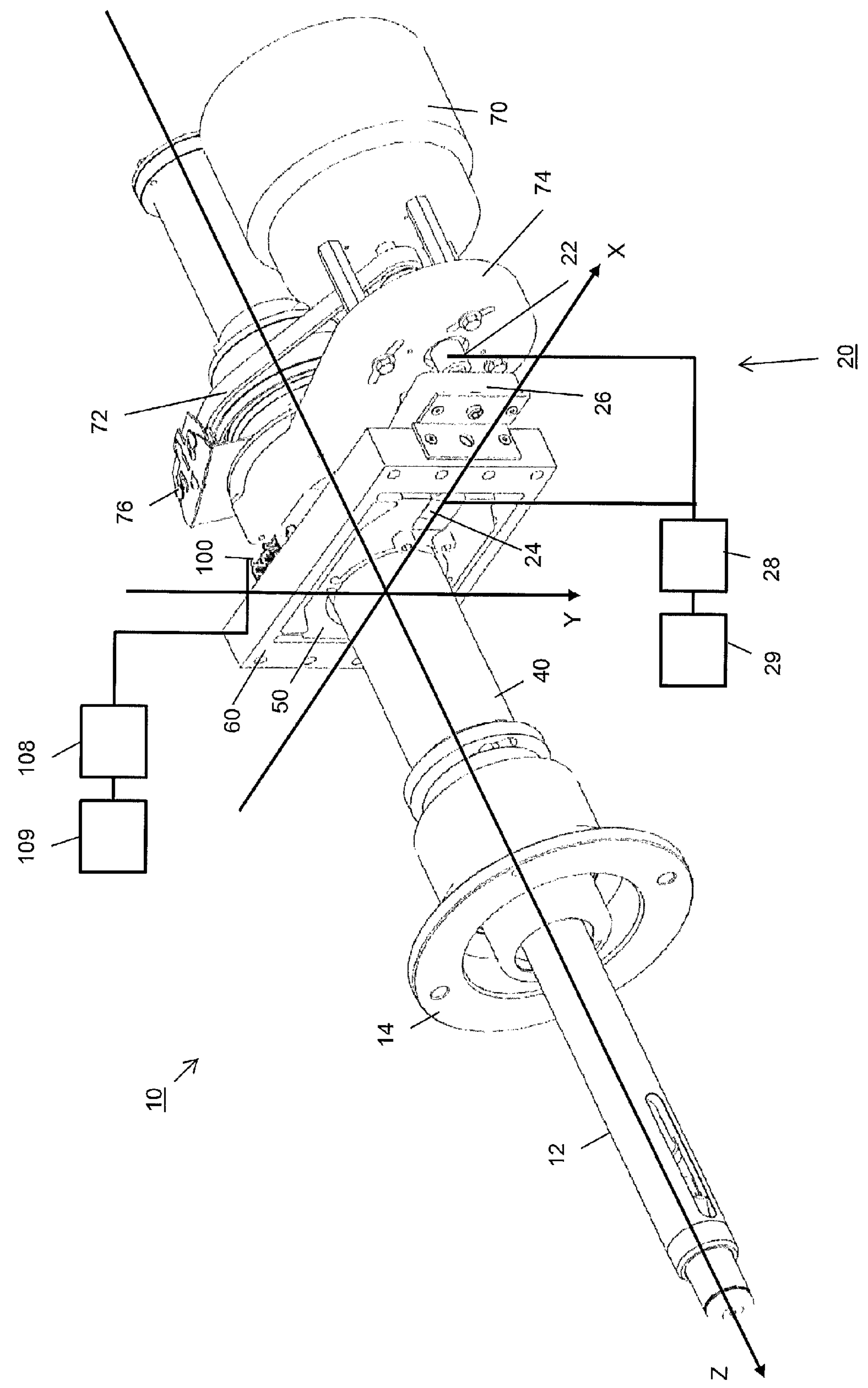
FIG. 3 shows a schematic and perspective view of a part of the wheel balancing machine of FIG. 2 including exemplary measuring units according to the present invention.

FIG. 3 shows measuring assembly 10 for measuring forces, especially unbalance forces generated by an unbalance of a rotating vehicle wheel (not shown) about measuring shaft 12 in more detail. For clearness of the drawing, measuring assembly 10 is shown in FIG. 3 with measuring units 20 and 100 only.

Measuring shaft 12 is rotatably mounted within a first bearing 40 to be rotated about its shaft axis Z. In this example, for instance, measuring shaft 12 is rotatably supported by means of roller bearings (not shown) within tubular first bearing 40. The rotation of drive means 70 is transmitted to measuring shaft 12 by means of a transmission belt 72. Drive means 70 itself is supported relative to first bearing 40 by a support member 74, which is rigidly connected to both first bearing 40 and drive means 70. Additional electronic means 76, for instance for driving the clamping system for clamping the vehicle wheel with clamping means 14, are also shown. Electronic means 76 can, however, also control additional or different electronics parts in a different example.

Orthogonal with respect to the direction of shaft axis Z of measuring shaft 12, a transverse axis X and a pivot axis Y are shown. The axes X, Y and Z form an orthogonal system of axes. The origin of this orthogonal system is depicted at the point intersecting the centre of measuring shaft 12 in the direction of shaft axis Z and the central plane in a thickness direction of a stationary frame 60, wherein stationary frame 60 extends in transverse axis X and pivot axis Y. Stationary frame 60 essentially supports measuring shaft 12 and therefore the rotating vehicle wheel mounted thereon on machine frame 202 of wheel balancing machine 200. However, the skilled person realizes that this axis selection is arbitrary and the axes can be defined readily without difficulties.

It should be noted that although transverse axis X is shown in a horizontal and pivot axis Y is shown in a vertical orientation, the arrangement is not limited thereto and also other orientations, for instance having the entire assembly rotated about a certain degree, are contemplated by the skilled person.

Figure 4:
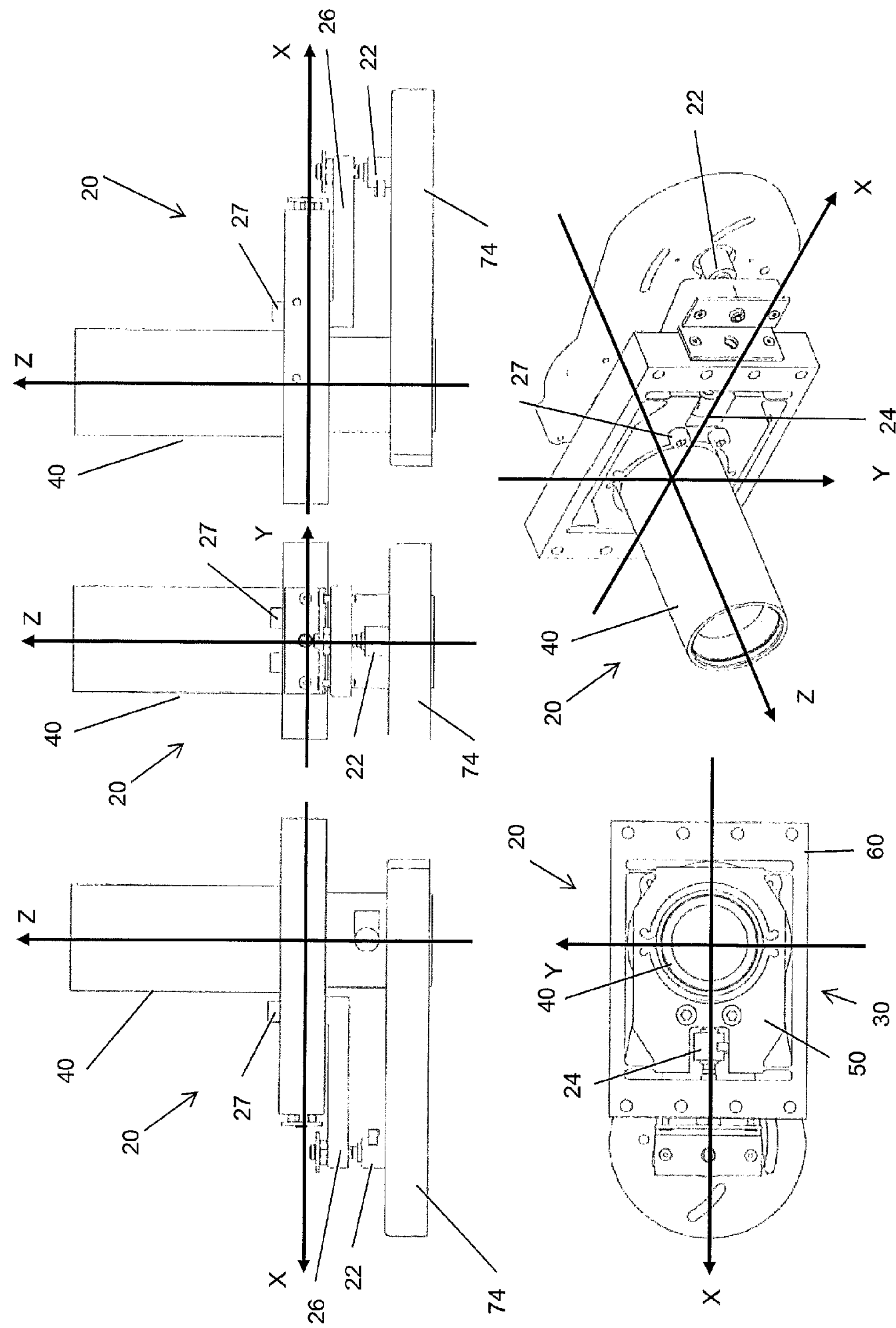
FIG. 4 shows multiple views of one exemplary measuring unit of FIG. 3 for measuring a displacement upon unbalanced rotation in more detail.

Measuring unit 20 for measuring centrifugal forces generated by an unbalance of the rotating vehicle wheel is now described in more detail with reference to FIG. 4. FIG. 4 shows multiple views of measuring unit 20 from different angles of view.

A second bearing 50 supports first bearing 40 inserted therein and supports first bearing 40 rotatably about an axis corresponding to pivot axis Y, preferably perpendicular to shaft axis Z of measuring shaft 12.

Second bearing 50 is supported within stationary frame 60 such that translational movements are possible in a direction of transverse axis X. Accordingly, the translational movement between second bearing 50 and stationary frame 60 is perpendicular to pivot axis Y, defined by the rotation axis defined by second bearing 50 and first bearing 40. In other words, both axes of movement, namely the rotation about pivot axis Y and the translation in direction of transverse axis X, are orthogonal to shaft axis Z.

Figure 5:
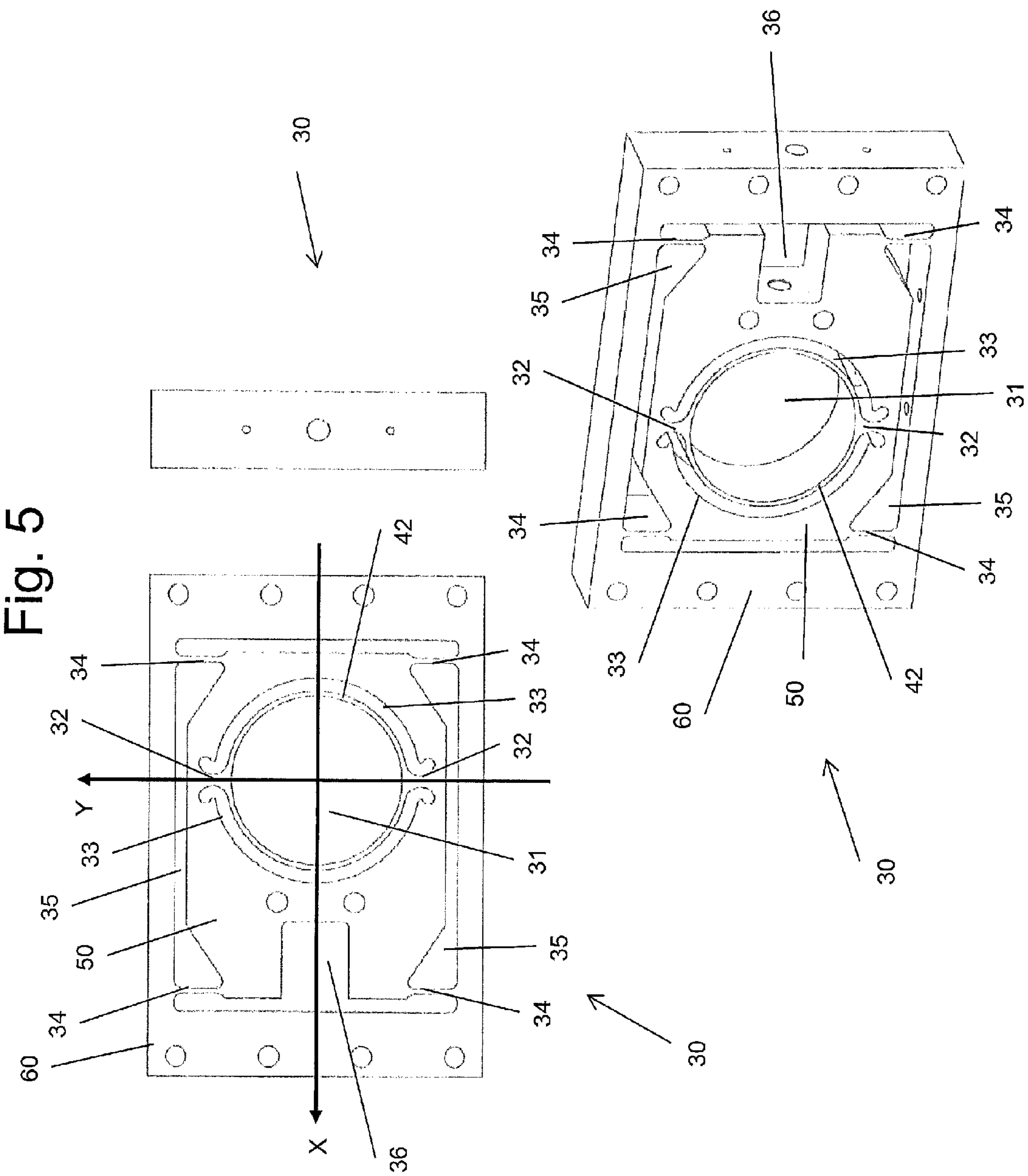
FIG. 5 shows multiple views of a support plate employed within the exemplary measuring unit of FIG. 3 and FIG. 4.

In this example, at least part of first bearing 40, second bearing 50 and stationary frame 60 are formed of a single support plate 30, which is now described in more detail with reference to FIG. 5. FIG. 5 shows different side views of support plate 30 seen from different points of view. With X, Y and Z, the same axes as described with reference to FIGS. 3 and 4 are referred to.

In the centre of support plate 30, there is provided a through hole 31, through which measuring shaft 12 surrounded by first bearing 40 is inserted. To this end, support plate 30 also comprises a thin ring-shaped member 42 that improves the coupling between support plate 30 and tubular first bearing 40. Radially outward from ring-shaped member 42, there is provided second bearing 50. Between second bearing 50 and ring-shaped member 42 there is a free space 33 at almost the entire circumference of ring-shaped member 42, except for two oppositely located thin portions, namely first spring elements 32. First spring elements 32 are provided to support ring-shaped member 42 and thus first bearing 40 inserted therein pivotally about second bearing 50. In this case, first spring elements 32 can also be referred to as torsion springs. A stiffness and force constant of these torsion springs 32 can be adjusted by geometrical considerations of the particular implementation. In this example, the torsion springs are aligned with the pivot axis Y such that measuring shaft 12 can pivot by virtue of the torsion springs.

Finally, further radially outward, support plate 30 comprises stationary frame 64 connecting measuring assembly 10 with a machine frame of a tyre service machine (not shown). A free space 35 between second bearing 50 and stationary frame 60 is bridged by four second spring elements 34, in this case plate springs 34, which are substantially symmetrically placed at all edges of second bearing 50 in the X-Y-plane, which is the plane having support plate 30 aligned therewith. Plate springs 34 support second bearing 50 movable along the transverse axis X with respect to fixed stationary frame 60.

In summary, first bearing 40 and thus measuring shaft 12 is allowed a pivot movement about pivot axis Y and a linear movement along transverse axis X. In this case, pivot axis Y and transverse axis X are orthogonal with respect to each other, therefore allowing a clean separation of measurements measuring the respective movements.

Radially outward from the centre of ring-shaped member 42 towards stationary frame 60 in the direction of transverse axis X, there is a sensor recess 36 formed. A sensor mounted therein can ensure that the measurement direction of such sensor be optimized with respect to the linear movement along transverse axis X and at the same time the overall extension of measuring unit 20 does not exceed the dimension of support plate 30 in the axial direction of shaft axis Z.

In one example, the entire tubular first bearing 40 can also be formed as an integral part of support plate 30. In another example, tubular first bearing 40 can be fixed to ring shaped member 42, such as by welding or a different suitable process. In a further example, support plate 30 does not provide ring shaped member 42 and first bearing 40 is directly fixed to first spring elements 32.

Now that the supporting structure involving support plate 30 has been extensively discussed, the actual force and movement measuring arrangement will be described with reference again to FIG. 4. First force sensor 22 measures forces generated by unbalance of the rotating vehicle wheel and acting pivotally about pivot axis Y. A second force sensor 24 measures forces generated also by unbalance of the rotating rotor and acting upon measuring shaft 12 and second bearing 50 linearly along transverse axis X.

First force sensor 22 is positioned and tensioned between first bearing 40 and second bearing 50. The measuring direction of force sensor 22 substantially corresponds to shaft axis Z and measures the force with which first bearing 40 is pivoting about pivot axis Y. Although in this example, the measuring direction is substantially parallel to shaft axis Z, also other measurement directions are contemplated. However, the measurement direction of first force sensor 22 must be inclined with an angle with respect to pivot axis Y. It is thus preferred that the angle between pivot axis Y and the measuring direction of the first force sensor 22 be close to 90°, such as 75° to 105°, preferably 80° to 100°, more preferably 85° to 95°, and most preferably from 89° to 91°.

On one end thereof, first force sensor 22 is attached to drive support member 74. Thereby, no additional supporting structure for supporting first force sensor 22 becomes necessary. The other end of first force sensor 22 is attached to a lever 26, which is rigidly fixed to second bearing 50 by means of an optional lever connecting means 28, such as two screws in this example. Lever 26 conducts any pivotal movement about pivot axis Y radially outward to a position in proximity to the one end of first force sensor 22 being attached to drive support member 74. With increasing distance from pivot axis Y, displacements induced by the rotation between lever 26 and drive support member 74 become larger, thus reducing the error of first force sensor 22. However, since first force sensor 22 is provided in the space between drive support member 74 and second bearing 50, the overall extension is not increased.

Instead of being connected between second bearing 50 and drive support means 74, first force sensor 22 can also be connected between stationary frame 60 and first bearing 40, respectively drive support means 74. In this case, first force sensor 22 measures a pivot movement about pivot axis Y overlaid with a longitudinal movement along transverse axis X. However, since the longitudinal movement is orthogonal to the pivot movement, the two movements can be separated easily.

A second force sensor 24 is positioned between second bearing 50 and stationary frame 60 within sensor recess 36. Thus, second force sensor 24 must not extend axially over support plate 30. Thereby, the overall size and dimension of measuring unit 20 can be reduced. Since sensor recess 36 is provided in a radial direction with respect to the centre of the through hole 31 for receiving measuring shaft 12 therein, the measuring axis of second force sensor 24 intersects the centre of measuring shaft 12 and corresponds to transverse axis X.

Although first force sensor 22 and second force sensor 24 are exemplified at the particular positions shown in the figures, different locations for the respective sensors are also contemplated by the person skilled in the art. Most importantly, the location of the first and second force sensor 22, 24, respectively, must allow for a separation of the two axis of movement, namely the rotation about pivot axis Y and the translation along transverse axis X.

In this example, piezo-electric force sensors can be used as an example of first force sensor 22 and second force sensor 24. However, also different types of force sensors known to the skilled person are considered.

Returning to FIG. 3, a further example of a measuring unit, namely rotational encoder unit 100, provides the rotational position of measuring shaft 12, such that forces measured by measuring unit 20 can be corresponded to a particular rotational position of the measuring shaft. In other words, the rotational position is needed in order to bring measured force values into relation with a physical position on the wheel in order to calculate balancing weight needed for balancing the wheel. Rotational encoder unit 100 is, in this example, an optical encoder, for instance with the configuration known from EP 1 089 059 B1.

In one example, data communication component 109 transmits data processed by data processing component 108 to data communication component 29 of measuring unit 20. Data processing component 28 can evaluate both the data received from data communication component 29 and from first and second force sensors 22, 24 and transfer the evaluated result, for instance, via data processing components 29 and 209 to processing unit 208. However, with different measuring units and in different examples, the data communication can also be different. For instance, data communication components 29 and 109 can directly transfer data to data communication component 209 for evaluation by processing unit 208. This flexibility in communication is made possible by using a sensor-independent protocol, since the respective data communication component can understand the received data independent from the type of sensor it had been sent from.

Figure 6:
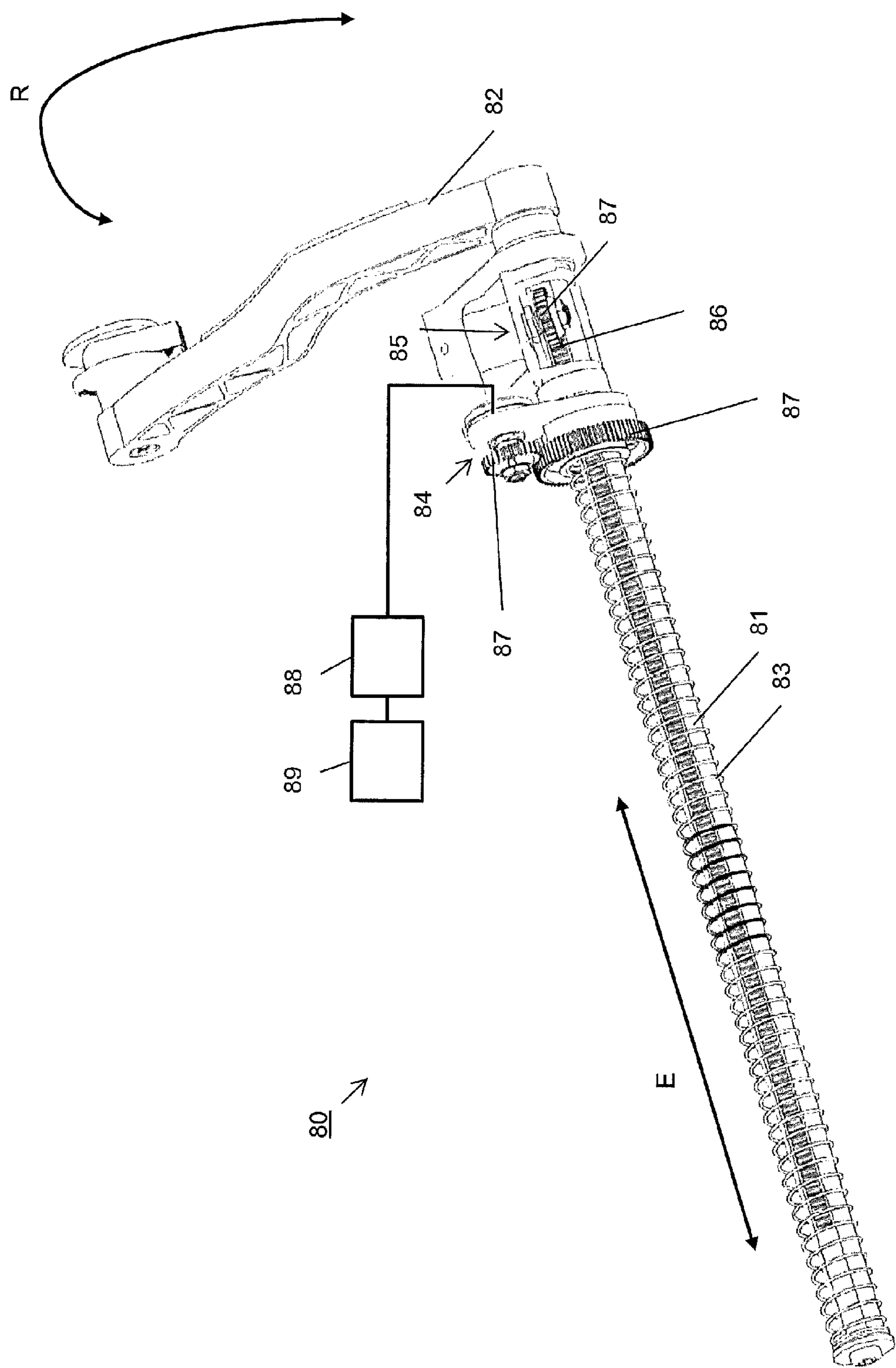
FIG. 6 shows a schematic and perspective view of a semi-automatic parameter entry device as a further example of a measuring unit for a communication system for a tyre service machine according to the present invention.

Next, measuring unit 80 as shown in FIGS. 1 and 2 is explained in detail with reference to FIG. 6. FIG. 6 shows a perspective and schematic view of a semi-automatic parameter entry (SAPE) feeler unit 80 as an example for a measurement unit for being used with communication system 1. To this end, SAPE unit 80 comprises, as discussed above, processing component 88 and data communication component 89 for carrying out wireless data communication to a further data communication component according to a sensor-independent protocol.

SAPE unit 80 comprises a feeler component comprising an axial extension section 81 and a radial rotation section 82. The feeler component is formed in the form of a bent arm, with the radial rotation section 82 extending substantially perpendicular from the forward end of the axial extension section 81. In this context, with “forward” the vehicle wheel mounting side of the wheel balancing machine is referred to.

FIG. 6 shows SAPE unit 80 in the resting position, which is the position with the axial extension section 81 being retracted to the rear of the measuring assembly 20 and the radial rotation section 82 being substantially horizontal with respect to the wheel balancing machine 200, as can best be seen in FIG. 6. A rejecting force is applied onto axial extension section 81 by means of spring 83, which biases axial extension section 81 towards the resting position.

Further, a retention means for biasing radial rotation section 82 towards the radial resting position can be provided, such as a torsion spring (not shown).

The radial rotation about rotation axis R and the axial extension along extension axis E can thus be determined based on the retaining forces by means of a first sensor 84 and a second sensor 85, respectively. In this example, first sensor 84 and second sensor 85 are provided as potentiometers, wherein also different sensor means are contemplated.

The coupling between first sensor 84 and radial rotation section 82 is achieved by means of geared wheels 87. The coupling between second sensor 85 and axial extension section 81 is achieved by means of a rack 86 provided on a surface of axial extension section 81 which engages with a geared wheel 87 provided with second sensor 85.

Both first sensor 84 and second sensor 85 are connected with processing component 88 for receiving and processing data sensed by the respective sensors. Processing component 88 can transfer and receive processed data and/or further information from wheel balancing machine 200, more precisely from data communication component 209 thereof, by means of data communication component 89, which is a wireless data transmission unit in this example.

In this example, the feeler component can be manually positioned by the user in order to indicate, for example, positions of spokes of a rim of the vehicle wheel.

In a further example, first sensor 84 and second sensor 85 can further comprise drive means for driving axial extension section 81 and radial rotation section 82 towards a defined position, such as a position for applying balancing weight calculated by processing unit 208 of wheel balancing machine 200.

In even a further example, the position of weight to be applied can be indicated by means of a geometrical sensing unit 90 (described below). The weight can thus be mounted onto the end of radial rotation section 82 and attached at the indicated position by manually or automatically moving the feeler unit towards the indicated position and applying a pressure at the indicated position of the rim via the feeler unit for the weight to attach at the specified position.

Figure 7:
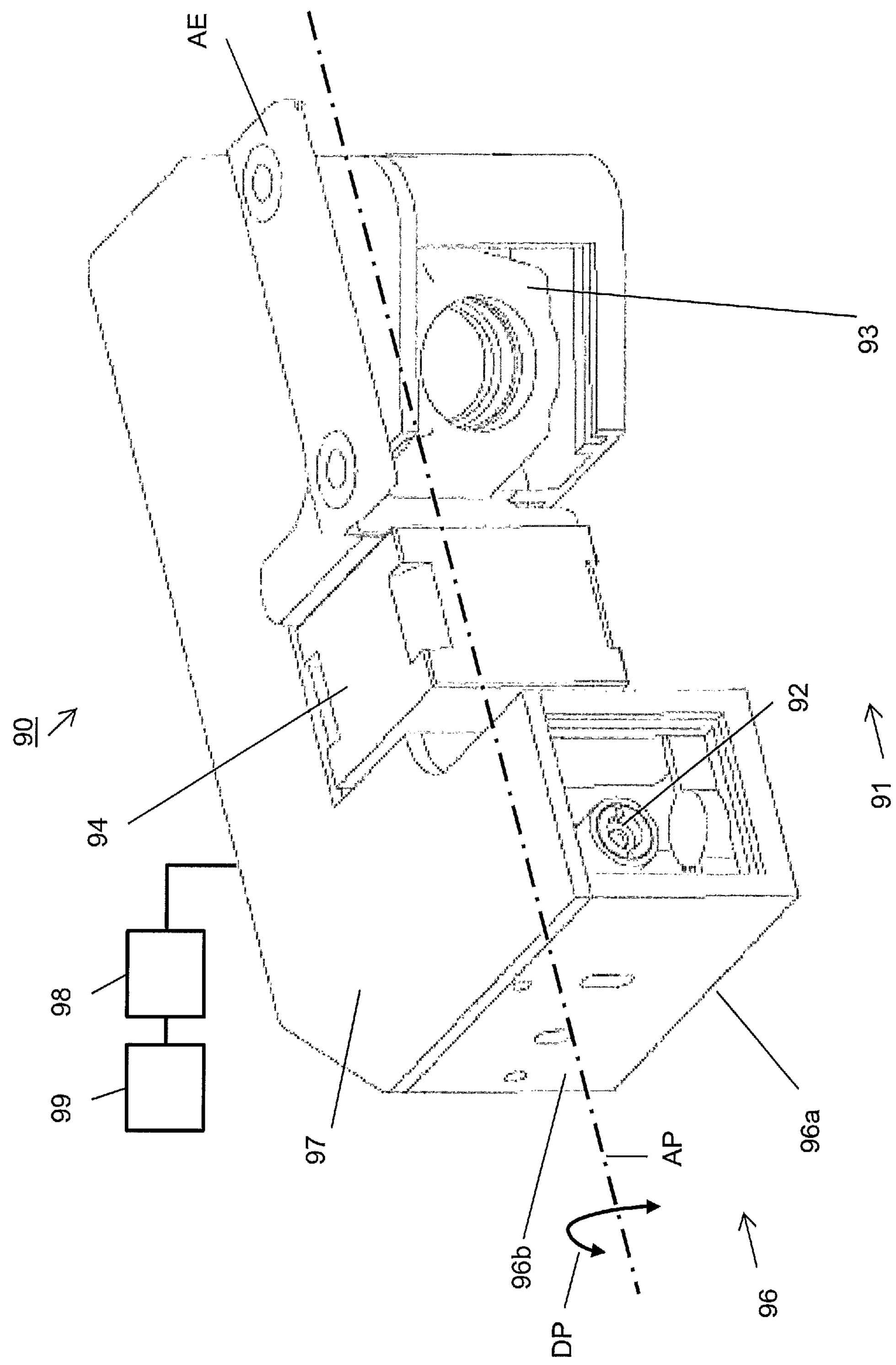
FIG. 7 shows a schematic and perspective view of a further example of a measuring unit for a communication system for a tyre service machine according to the present invention.

Finally, FIG. 7 is a schematic and perspective view of a geometrical sensing unit 90 according to one embodiment of the present invention that includes as its main components a first sensing component 91 which is preferably an optical sensing component and a second sensing component (not shown) which includes a position sensitive element. Geometrical sensing unit 90 further comprises a housing 96 and a coverage 97 arranged at the upper end of sidewalls 96*b* of housing 96.

In FIG. 7, also a drive means 94 is shown, which may be coupled to the machine frame 202 of a wheel balancing machine 200 (see FIG. 2) via an attachment element AE. Drive means 94 which is a micro stepper motor, comprises a motor shaft to which geometrical sensing unit 90 is coupled for executing a pivot movement. The motor shaft of drive means or motor 94 provides a pivot axis AP about which geometrical sensing unit 90 is pivoted in pivot direction DP.

In this example, drive means 20 is a standard stepper motor imparted with micro stepping capabilities by the use of ad hoc control electronics, such as, for instance, the dSPINTM fully integrated microstepping motor driver provided by STMicroelectronics. However, in different examples, the micro stepping capabilities of drive means 20 can also be provided in a different way.

Figure 8:
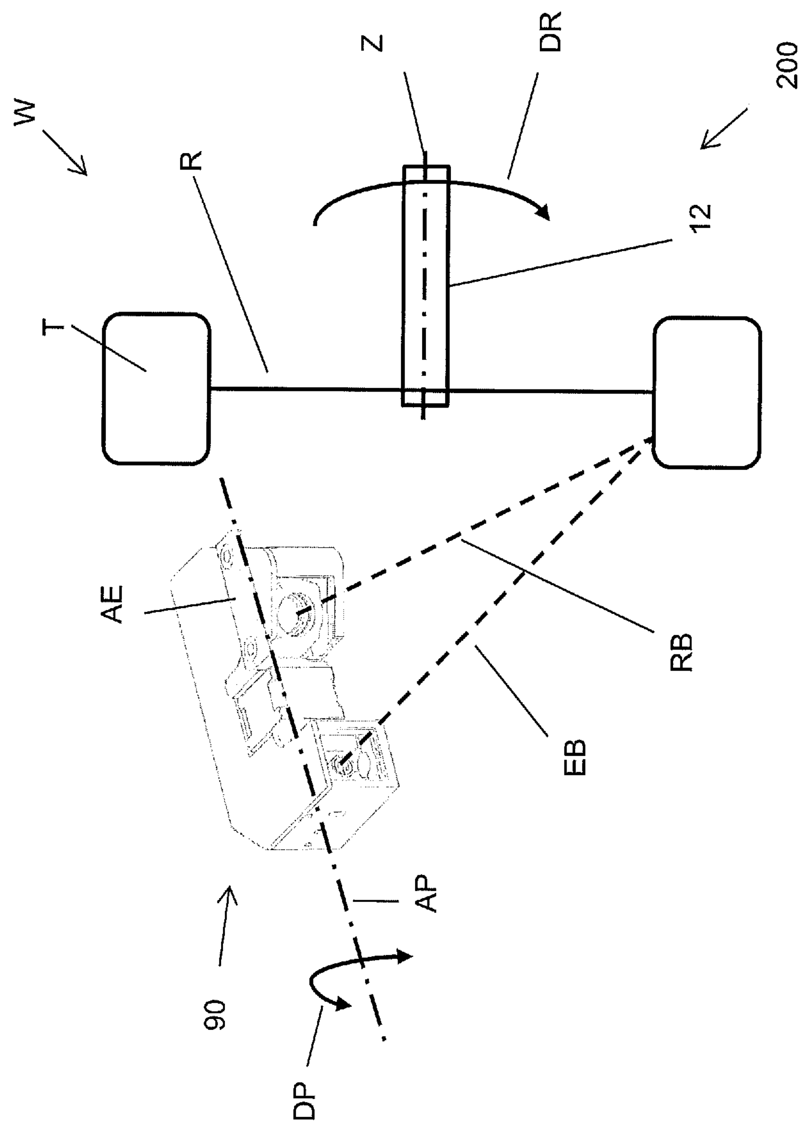
FIG. 8 shows a schematic and perspective view of a tyre service machine which includes the exemplary measuring unit according to FIG. 7.

FIG. 8 is a schematic and perspective view of wheel balancing machine 200, as exemplarily shown in FIG. 2, which includes a geometrical sensing unit 90 according to the present invention.

Wheel balancing machine 200 includes in this example an approximately horizontally arranged measuring shaft 12 on which a wheel W, like a vehicle wheel, is mounted. Measuring shaft 12 has a shaft axis Z about which measuring shaft 12 can be rotated, e.g. during the measurement step of the service operation, like a balancing operation or a tyre mounting or demounting operation. Wheel W includes a rim B and a tyre T. It has to be noted that measuring shaft 12 may also have any other suitable orientation, e.g. measuring shaft 12 may be arranged vertically.

Wheel balancing machine 200 includes an approximately horizontally arranged measuring shaft 12 on which a wheel W, like a vehicle wheel, is mounted. Measuring shaft 12 has shaft axis Z about which measuring shaft 12 can be rotated, e.g. a balancing operation. Wheel W includes a rim R and a tyre T. It has to be noted that measuring shaft 12 may also have any other suitable orientation, e.g. measuring shaft 12 may be arranged vertically. Nevertheless, even that in this example a wheel balancing machine 200 is used, also different tyre service machines, such as tyre mounting machines, are contemplated.

Geometrical sensing unit 90 is pivotally mounted to machine frame 202 of wheel balancing machine 200 by attachment element AE which is fixedly coupled to motor 94. The pivoting shaft or motor shaft is arranged approximately horizontally to base portion 96*a* of housing 96. Accordingly, pivot axis AP is also arranged at least approximately horizontally to base portion 96*a* of housing 96. Thus, geometrical sensing unit 90 may reversibly be pivoted in pivot direction DP about pivot axis AP in a plane vertically to base portion 96*a* of housing 96.

A light beam EB emitted by emitter 92 of first sensing component 91, impinges rim R or tyre T of wheel W and is reflected therefrom. The reflected light beam RB is received by receiver 93 of first sensing component 91.

A second sensing component which, in this embodiment of a measuring unit, is also accommodated in housing 96 of geometrical sensing unit 90, includes a position sensitive element for detecting the position of geometrical sensing unit 90 during the pivot movement. The beginning and the end of a measuring operation are predetermined conventionally by processing unit 208 or processing component 98 of geometrical sensing unit 90 and the start as well as the end position of a sensing component for executing the pivot movement, are accomplished by mechanical stoppers. It is also possible to determine the start and end position of geometrical sensing unit 90 by the second sensing component, or to provide predefined start and end positions, which are detected by the second sensing component for starting or stopping the movement of geometrical sensing unit 90.

The second sensing unit may include any suitable position sensitive elements (not shown). These position sensitive elements or sensors are also coupled fixedly to housing 96 of geometrical sensing unit 90. In a preferred embodiment, the second sensing component includes at least one, preferably two accelerometer sensors, which may detect the movement of geometrical sensing unit 90 in one or two planes. In case that two sensors are provided, the detection planes may be arranged in any suitable angle to each other. It is also possible to use any other suitable angle measuring sensors, like inclinometers or encoders, for detecting the angular position of geometrical sensing unit 90.

In this example, the at least one accelerometer sensor is a MEMS (micro electromechanical systems) accelerometer. However, in different examples, also other accelerometer sensors known in the art are contemplated.

Figure 9:
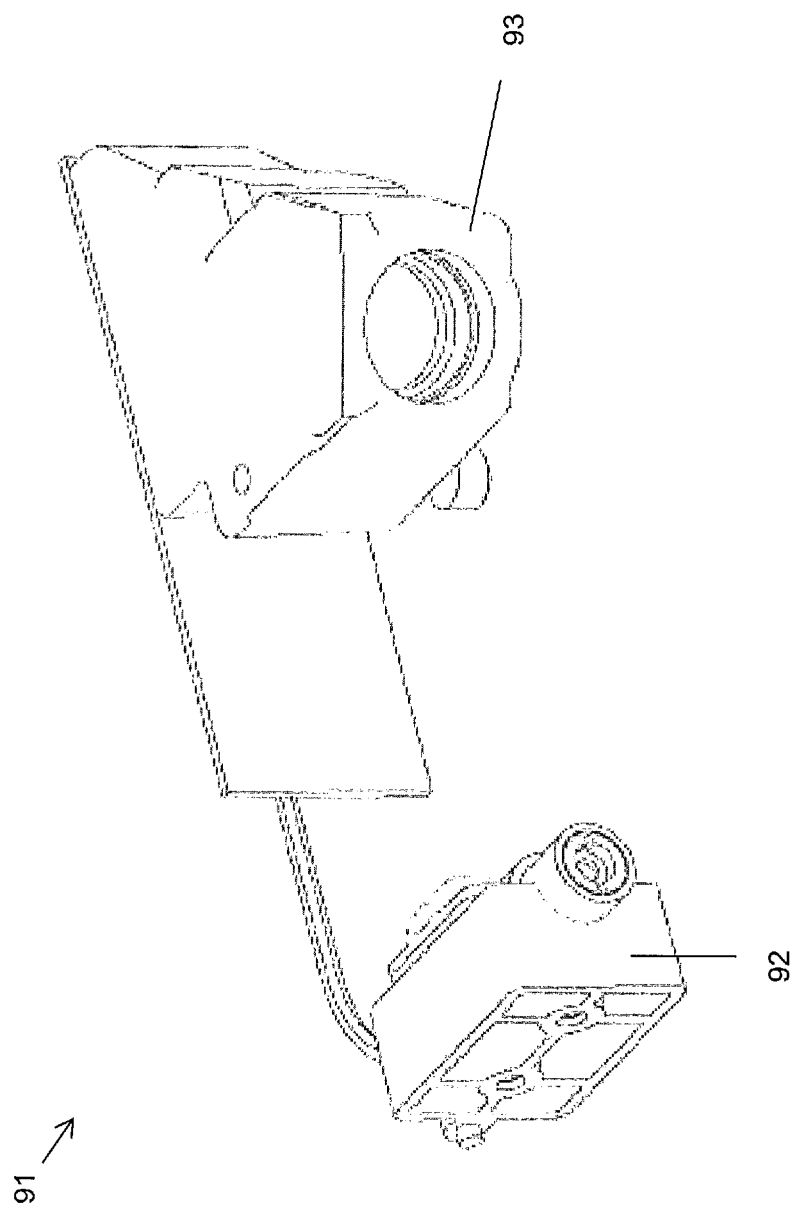
FIG. 9 shows a schematic and perspective view of the first sensor of the measuring unit according to FIG. 7.
Figure 10:
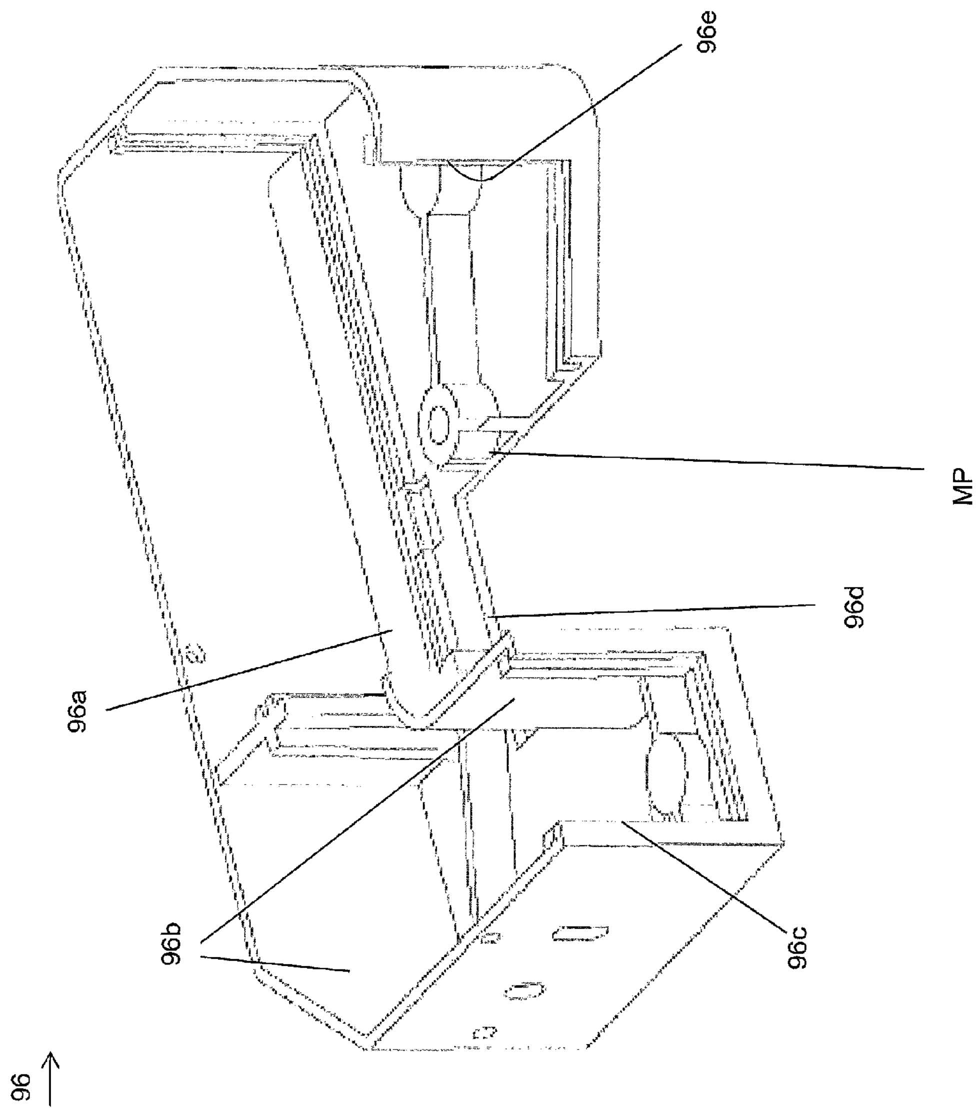
FIG. 10 shows a schematic and perspective view of the carrier element of the measuring unit according to FIG. 7.

As it can be seen in FIG. 9, first sensing component 91 which is preferably an optical sensing component, includes an emitter 92 and a receiver 93. Emitter 92 which is preferably a laser, and emitter 92 which is preferably a CCD or CMOS sensor, are fixedly coupled to housing 96, and arranged in fixed relation relative to each other defining an acute angle between their optical axes, preferably equal to or less than 45°.

As further shown in FIG. 7, drive means 94 which, in the embodiment of FIG. 7, is a micro stepper motor. In an alternative embodiment, drive means or motor 94 may also be accommodated in housing 96 and fixedly coupled thereto. In this embodiment, drive means 94 may further include a gear (not shown) which is aligned to pivot axis AP about which geometrical sensing unit 90 may be reversibly pivoted in a pivot direction DP. In this embodiment, pivot axis AP is also oriented horizontally. However, the inventive geometrical sensing unit 90 can be arranged in any other orientation, i.e. with a pivot axis AP being vertically oriented or somewhere between a horizontal and vertical orientation.

FIG. 9 shows housing 96, which functions as a carrier element for the main components of geometrical sensing unit 90, i.e. first sensing component 91, the second sensing component and drive means 94, and has a flat base portion 96*a* and a side wall 96*b* arranged at the circumferential edge of base portion 96*a* and extending upwardly there from. Side walls 96*b* surround at least substantially base portion 96*a* and are only discontinued to provide openings 96*c*, 96*d*, 96*e* for emitter 92 and receiver 93 of the first sensing component 91 as well as drive means 94. Emitter 92 can emit light beams via opening 96*c* whereas receiver 93 can receive the light beam reflected from the tyre and/or rim of wheel W via opening 96*e*.

Moreover, base portion 96*a* is provided with alignment and assembly aid elements like, for example, ribs, projections and indentions for providing well defined locations for the mounting of the components of first sensing component 91 and/or the second sensing component and/or drive means 94. These alignment and assembly aid elements can also be provided for accommodating one or several circuit boards for controlling the first sensing component 91 and/or drive means 94. Additionally, said alignment and assembly aid elements may also provided for accommodating protective elements for protecting the components of geometrical sensing unit 90, like protective glasses covering emitter 92 and receiver 93. Furthermore, the components for a wireless data transmission can be accommodated in housing 96, for example via alignment and assembly aid elements.

Coverage 97 which is formed by a flat material and has an outer contour at least approximately congruent with base portion 96*a* of housing 96. Coverage 97 is arranged at the upper edge of side walls 96*b*, and covers the space in housing 96.

Housing 96 and coverage 97 are made from any suitable material, preferably plastics or metal. In one embodiment, housing 96 may be made from metal for providing a strong base for the components of geometrical sensing unit 90, and coverage 97 is made from plastics for enabling a wireless data transmission, for instance by means of data communication component 99.

When mounting geometrical sensing unit 90 to a machine, the design of the inventive geometrical sensing unit 90 allows that only emitter 92 has to be adjusted. Due to the defined relationship between emitter 92 and receiver 93 by base portion 96*a*, no further adjustment is necessary. However, it is also possible that both emitter 92 and receiver 93 can be adjusted, e.g. while assembling geometrical sensing unit 90.

Figure 11:
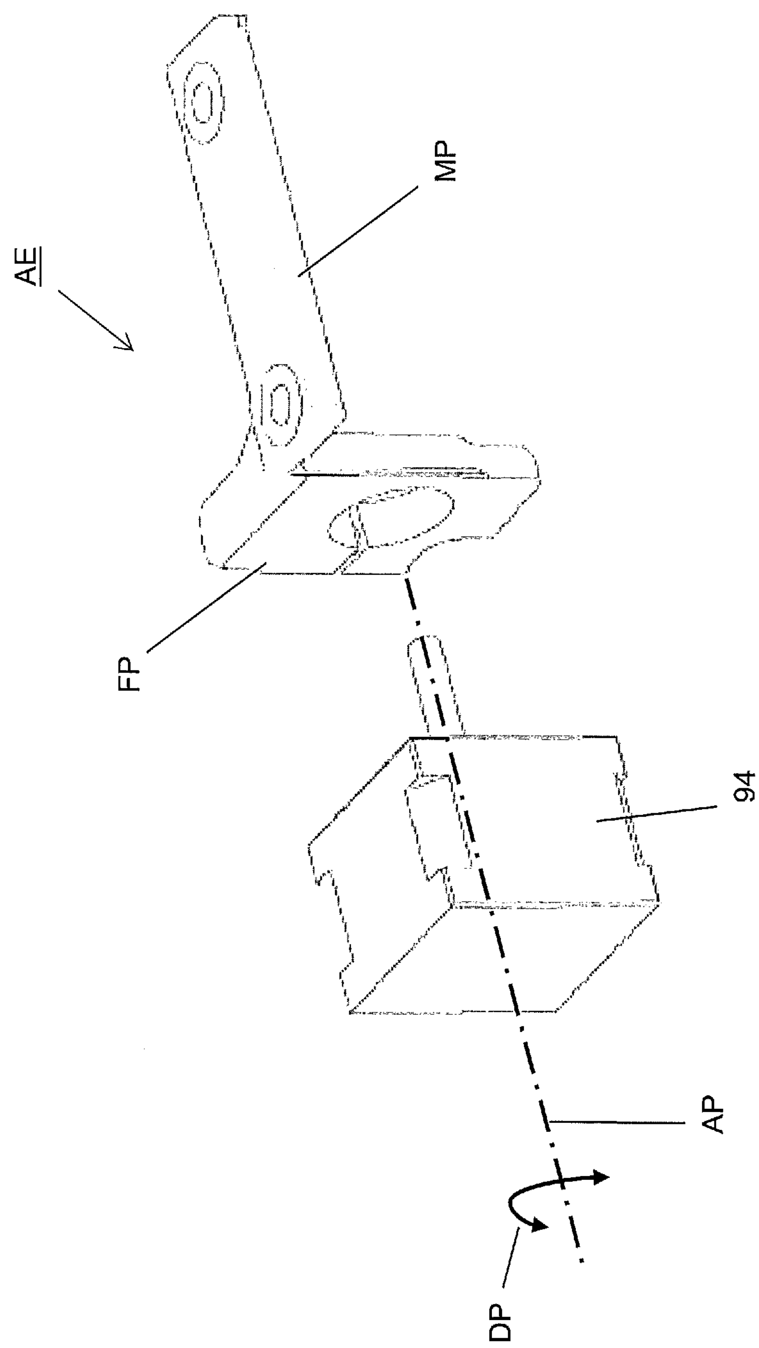
FIG. 11 shows a schematic and perspective view of the drive means and the attachment element of the measuring unit according to FIG. 7.

FIG. 11 is a schematic and perspective view of drive means 94 and attachment element AE according to the present invention.

As can be seen in FIG. 11, attachment element AE has a mounting portion MP, by means of which it is mounted machine frame 202 of wheel balancing machine 200, and a flange portion FP, by means of which attachment element AE is coupled to drive means or motor 94. Flange portion FP has a central opening through which the motor shaft of motor 94 extends, when attachment element AE is coupled to motor 94. Mounting portion MP of attachment element AE, in the embodiment of FIG. 11, comprises two holes for mounting attachment element AE to machine frame 202 of wheel balancing machine 200. It has to be understood that attachment element AE may have any other suitable design than that shown in FIG. 11.

As further shown in FIG. 11, pivot axis AP about which geometrical sensing unit 90 is pivoted during a measurement procedure, extends coaxially and centrally through the motor shaft of drive means 94.

For executing a service operation, a wheel W to be serviced is mounted on measuring shaft 12 of wheel balancing machine 200. Geometrical sensing unit 90, and particular first sensing component 91, is directed to wheel W for scanning the surface of tyre T and/or rim R, e.g. for detecting the geometry of tyre T or rim R. Particularly, geometrical sensing unit 90 may be used for identifying the position of a balancer weight to be attached to rim R for levelling an unbalance of wheel W.

Geometrical sensing unit 90 is pivoted about axis AP by drive means 94 for scanning tyre T and/or rim R of wheel W. Wheel W is further rotated about shaft axis Z of measuring shaft 12 in rotation direction DR. Thereby, an image of the whole tyre T and/or rim R may be created, or of predefined regions thereof, like the tyre profile. For instance, the geometry of the rim may be determined so that the position of the weight may be marked to allow an operator to place the weight in the correct angular position.

On the basis of the scanning results, in an example in which geometrical sensing unit 90 is provided with a tyre changer, the tyre conditions may be determined, e.g. the conditions of the profile or the side walls. Moreover, it may be determined whether or not the tyre has to be changed. Additionally, the kind or size of the tyre may be determined for selecting a respective new tyre to be mounted. Furthermore, also deformations of rim R may be detected and it may be determined whether or not rim R has to be changed.

Geometrical sensing unit 90 includes a processing component 98 for determining the distance and the angular position of the surface portion of tyre T or rim R just scanned. The respective data are, for instance, transmitted to processing unit 208 of wheel balancing machine 200, e.g. for controlling the rotation of wheel W about shaft axis Z of measuring shaft 12, for rotating wheel W in a predetermined position, in which a balancer weight has to be placed or in which a deformation has been detected. Based on the data of the accelerometer sensors, also the pivot position of geometrical sensing unit 90 may be controlled by processing unit 208 of wheel balancing machine 200.

The second sensing unit by means of which the angular position of geometrical sensing unit 90 is detected, may be used for a feedback control for correctly positioning wheel W and geometrical sensing unit 90, or for a re-measurement of selected portions of tyre T or rim R.

The data evaluated by geometrical sensing unit 90 are transferred to the control unit of wheel balancing machine 200 by means of data communication components 99, 209, respectively. In order to reduce potential risks of damages by reducing the amount of wires or cables, data communication component 99 preferably communicates wirelessly using a sensor-independent protocol. In one example, the sensor-independent protocol includes a respective interface, which preferably is a standardised interface, like an IR- or Bluetooth-interface.

LIST OF PARTICULARS

1 Communication system
10 Measuring assembly
12 Measuring shaft
14 Clamping means
20 Measuring unit
22 First force sensor
24 Second force sensor
26 Lever
27 Lever connecting means
28 Processing component
29 Data communication component
30 Support plate
31 Through hole
32 Torsion Springs
33 Free space
34 Plate Springs
35 Free space
36 Sensor recess
40 First bearing
42 Ring-shaped member
50 Second bearing
60 Stationary frame
70 Drive means
72 Transmission belt
74 Support member
76 Electronics
80 Semi-automatic parameter entry (SAPE) unit
81 Axial extension section
82 Radial rotation section
83 Spring
84 First sensor
85 Second sensor
86 Rack
87 Geared wheel
88 Processing component
89 Data communication component
90 Geometrical sensing unit
91 First sensing component
92 Emitter
93 Receiver
94 Drive means
96 Housing
96*a* Base portion
96*b* Sidewall
97 Coverage
98 Processing component
99 Data communication component
100 Rotation encoder unit
108 Processing component

109 Data communication component
200 Wheel balancing machine
202 Machine frame
208 Processing component
209 Data communication component
E SAPE extension direction
R SAPE rotation direction
X Transverse axis
Y Pivot axis
Z Shaft axis
AE Attachment element
AP Geometrical sensing unit pivot axis
DP Geometrical sensing unit pivot direction
FP Flange portion
MP Mounting portion

The invention claimed is:

1. A communication system for a tire service machine being configured for receiving a tire and/or a rim of a vehicle wheel rotatably about a rotation axis, the communication system comprising at least one processing unit and at least one measuring unit, the at least one measuring unit comprising:

at least one sensor component for measuring, when the wheel is mounted on the tire service machine, at least one property specific to the wheel, a processing component for processing data acquired by the at least one sensor component and/or for processing input data received from at least one of the at least one processing unit, the at least one processing unit and the at least one measuring unit each comprising a data communication component for receiving data from and/or transmitting data to another data communication component;

wherein the data communication components of the at least one processing unit and the data communication components of the at least one measuring unit are arranged for communicating wirelessly with each other in accordance with at least one sensor-independent protocol.

2. The communication system of claim 1, wherein at least one processing unit is a processing unit of the tire service machine.

3. The communication system of claim 1, wherein at least one processing unit is located remote from the tire service machine.

4. The communication system of claim 1, wherein at least one processing unit comprises a data recording component for recording data received by the data communication component of the processing unit from the data communication component of the measuring unit.

5. The communication system of claim 1, wherein at least one of the at least one measuring unit and/or at least one of the at least one processing unit is provided within a casing, preferably a metallic casing, such as a machine frame of the tire service machine.

6. The communication system of claim 5, wherein the metallic casing comprises at least one transmitting window.

7. The communication system of claim 1, comprising at least two processing units, wherein the data communication components of the at least two processing units are arranged for communicating wirelessly with each other in accordance with at least one sensor-independent protocol.

8. The communication system of claim 1, wherein the data communication components of the at least one processing unit and the at least one measuring unit are arranged for communicating according to at least two sensor-independent protocols, wherein at least one sensor-independent protocol is a local sensor-independent protocol for communication local to the tire service machine, and wherein at least another sensor-independent protocol is a remote sensor-independent protocol for communication with remote data communication components.

9. A measuring unit for a communication system for a tire service machine according to claim 1, comprising:

at least one sensor component for measuring at least one property of the wheel, a processing component for processing data acquired by the at least one sensor component and/or for processing input data received from a processing unit, a data communication component for transmitting data to and receiving data from at least the processing unit, wherein the data communication component is configured for communicating wirelessly in accordance with a sensor-independent protocol.

10. The measuring unit according to claim 9, wherein the tire service machine is a wheel balancing machine comprising a measuring shaft configured for receiving the vehicle wheel thereon and being displaceable by unbalanced rotation of the vehicle wheel about the measuring shaft, wherein the sensor component is arranged for measuring a displacement of the measuring shaft upon unbalanced rotation of the vehicle wheel, the measuring unit comprising:

a stationary frame, a first bearing for receiving the measuring shaft rotatably about its shaft axis (Z), a second bearing pivotally supporting the first bearing about a pivot axis (Y) which intersects the shaft axis (Z) and being supported on the stationary frame, a first force sensor for measuring forces generated by an unbalance of the rotating vehicle wheel and acting on the measuring shaft about the pivot axis (Y), and a second force sensor for measuring forces generated by the unbalance of the rotating vehicle wheel and acting on the measuring shaft and on the second bearing in a direction intersecting the shaft axis (Z).

11. The measuring unit according to claim 10, wherein the second bearing and the stationary frame are integrally formed of a single element as a support plate.

12. The measuring unit according to claim 11, comprising at least one first spring, preferably at least one torsion spring, for pivotally supporting the first bearing within the second bearing about the pivot axis (Y), and at least one second spring, preferably at least one plate spring, for supporting the second bearing within the stationary frame, wherein the support plate comprises at least one of the at least one first spring and the at least one second spring as an integral part thereof.

13. The measuring unit according to claim 12, wherein the at least one second spring is configured such that the second bearing is translational moveable with respect to the stationary frame in a transverse axis (X) perpendicular to the shaft axis (Z) and/or the pivot axis (Y).

14. The measuring unit according to claim 11, comprising a drive support member in rigid connection with the first bearing for supporting a drive means for rotating the vehicle wheel about the shaft axis (Z), and a lever extending from the second bearing substantially parallel to the drive support member, wherein the first force sensor is with one end thereof mounted to the drive support member, wherein the second end of the first force sensor is mounted to the lever.

15. The measuring unit according to claim 9, comprising a drive means for enabling a pivotal movement of the at least one sensor component, the at least one sensor component comprising a first sensor for sensing the vehicle wheel, and a second sensor for sensing the angular position of the sensor component;

wherein the processing component is configured for determining the geometrical dimensions of the vehicle wheel based on data received from the first sensor and the second sensor.

16. The measuring unit according to claim 15, wherein the drive means is a micro-stepper motor, thereby disposing of any mechanical reduction gear.

17. The measuring unit according to claim 9, wherein the tire service machine is a wheel balancing machine and comprises a measuring shaft to which the vehicle wheel to be balanced is non-rotatably connectable, the measuring unit comprising a drive means for rotating the measuring shaft about an axis of rotation, the sensor component being associated with an electronic component for controlling the drive means.

18. The measuring unit according to claim 9, wherein the tire service machine is a wheel balancing machine and comprises a measuring shaft to which the vehicle wheel to be balanced is non-rotatably connectable, wherein the measuring shaft is rotatable about an axis of rotation, wherein the at least one sensor component comprising a rotary angle sensor being connected to the measuring shaft and having a light-emitting emitter, rotary angle increments in the form of reflectors arranged at equal angular spacings from each other on a circle rotatable about the axis of rotation, and a detector to which the light emitted by the emitter is passed by way of the rotary angle increments, the processing component being arranged for evaluating signals from the detector for rotary angle detection.

19. The measuring unit according to claim 9 being formed as a feeler unit for contacting the vehicle wheel at a defined position and comprising an axial extension section for translating the feeler unit along an axis (E) substantially parallel to a main axis of the tire service machine, and a radial rotation section for rotating the feeler unit about the axis (R) defined by the axial extension section, wherein the radial rotation section extends from the axial extension section at the end on the vehicle wheel side thereof in a direction substantially perpendicular to the axial extension section, and the at least one sensor component comprising a first sensor, such as a first potentiometer, for measuring a rotation of the radial rotation section, and a second sensor, such as a second potentiometer, for measuring an extension of the axial extension section.

20. The measuring unit according to claim 9, wherein the processing component is configured for controlling at least one electronic component of the tire service machine, wherein the electronic component is preferably a driving component such as an electric motor or a clamping or braking system.

* * * * *